(12) United States Patent
Guney

(10) Patent No.: US 11,842,363 B2
(45) Date of Patent: Dec. 12, 2023

(54) METHOD, SYSTEM, AND APPARATUS FOR ORGANIZING COMPETING USER CONTENT

(71) Applicant: Mehmet Yigit Guney, Oakton, VA (US)

(72) Inventor: Mehmet Yigit Guney, Oakton, VA (US)

(*) Notice: Subject to any disclaimer, the term of this patent is extended or adjusted under 35 U.S.C. 154(b) by 35 days.

(21) Appl. No.: 17/377,472

(22) Filed: Jul. 16, 2021

(65) Prior Publication Data
US 2022/0020045 A1    Jan. 20, 2022

Related U.S. Application Data

(60) Provisional application No. 63/052,758, filed on Jul. 16, 2020.

(51) Int. Cl.
| | |
|---|---|
| *G06F 3/048* | (2013.01) |
| *G06Q 30/0207* | (2023.01) |
| *G06F 3/04817* | (2022.01) |
| *G06F 3/04883* | (2022.01) |
| *H04L 67/306* | (2022.01) |
| *G06F 3/0482* | (2013.01) |
| *G06F 3/0485* | (2022.01) |
| *H04L 67/50* | (2022.01) |

(52) U.S. Cl.
CPC ....... *G06Q 30/0207* (2013.01); *G06F 3/0482* (2013.01); *G06F 3/0485* (2013.01); *G06F 3/04817* (2013.01); *G06F 3/04883* (2013.01); *H04L 67/306* (2013.01); *H04L 67/535* (2022.05)

(58) Field of Classification Search
None
See application file for complete search history.

(56) References Cited

U.S. PATENT DOCUMENTS

| | | | | |
|---|---|---|---|---|
| 10,620,801 | B1* | 4/2020 | Fein | G06F 3/04842 |
| 2008/0189272 | A1* | 8/2008 | Powers | G06F 16/9535 |
| 2012/0179557 | A1* | 7/2012 | Gross | G06Q 30/02 |
| | | | | 705/14.73 |
| 2012/0197979 | A1* | 8/2012 | Palm | G06Q 30/0282 |
| | | | | 709/203 |

(Continued)

*Primary Examiner* — William C Trapanese
(74) *Attorney, Agent, or Firm* — DITTHAVONG, STEINER & MLOTKOWSKI

(57) ABSTRACT

An approach is provided for facilitating a virtual competition for content creation and an effective UI for presenting content in an organized manner. The approach involves receiving, via a user device, a first content including execution of a first activity, wherein the first content is to be presented in a first arrangement. The approach also involves receiving, via another user device, a second content including execution of a second activity. The approach further involves determining that the first activity and the second activity are a common activity, and determining a score of the first activity and the second activity based on feedback from a plurality of users. The approach also involves ranking the first content and the second content based on a determined score. The approach further involves organizing the first content and the second content for presentation in a second arrangement based on the ranking.

16 Claims, 31 Drawing Sheets

(56) References Cited

U.S. PATENT DOCUMENTS

| | | | | |
|---|---|---|---|---|
| 2012/0215773 A1* | 8/2012 | Si | ............................ | G06Q 30/02 |
| | | | | 707/723 |
| 2013/0198677 A1* | 8/2013 | Dash | ..................... | G06F 3/0488 |
| | | | | 715/776 |
| 2013/0253994 A1* | 9/2013 | Brower | .............. | G06Q 20/0855 |
| | | | | 705/12 |
| 2016/0048519 A1* | 2/2016 | Chuah | .................. | G06F 16/9535 |
| | | | | 707/733 |
| 2017/0331865 A1* | 11/2017 | Yeskel | .................. | G06V 10/462 |
| 2019/0213406 A1* | 7/2019 | Porikli | ....................... | G06T 7/11 |
| 2019/0294640 A1* | 9/2019 | Chuah | ................. | G06F 16/9558 |

\* cited by examiner

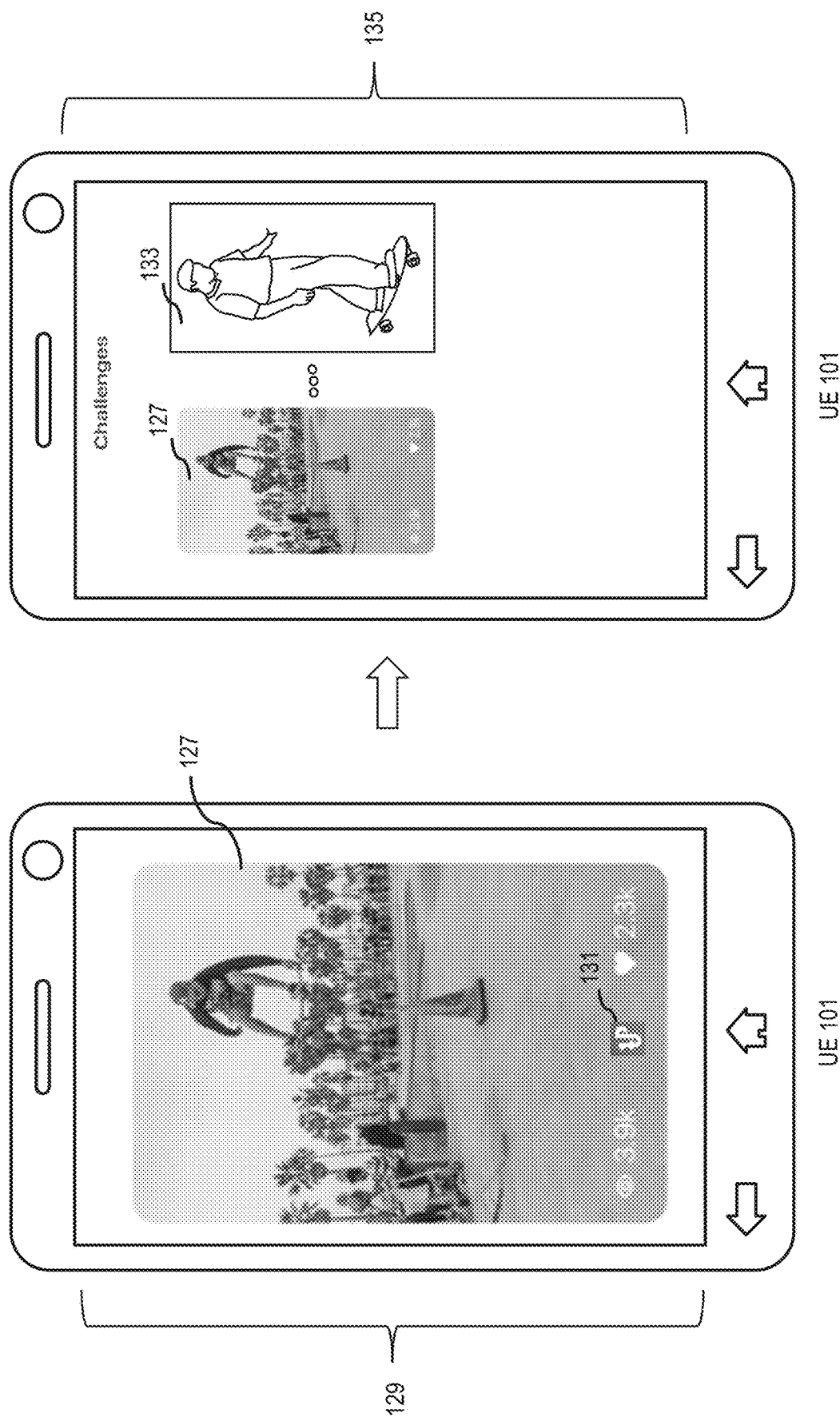

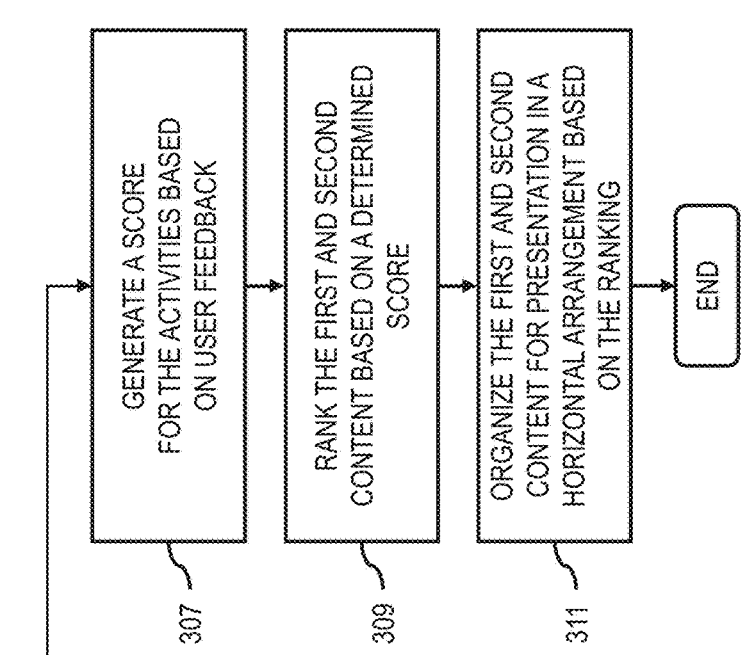

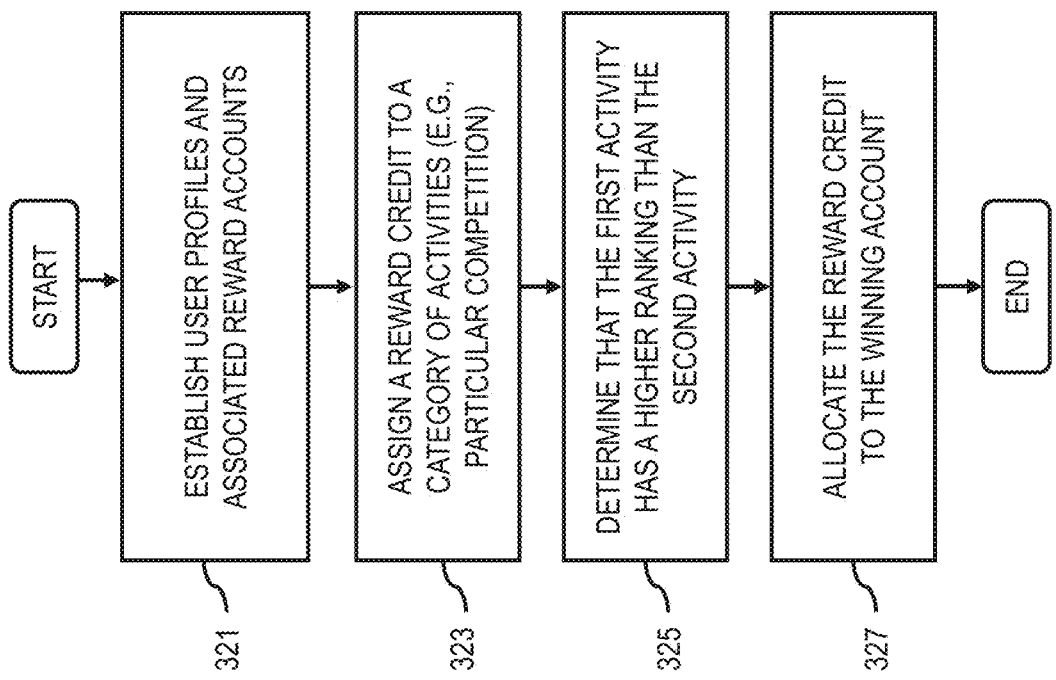

METHOD, SYSTEM, AND APPARATUS FOR ORGANIZING COMPETING USER CONTENT

RELATED APPLICATIONS

This application claims the benefit of U.S. Provisional Patent Application No. 63/052,758, titled "METHOD, SYSTEM, AND APPARATUS FOR ORGANIZING COMPETING USER CONTENT," filed Jul. 16, 2020, the entire disclosure of which is hereby incorporated by reference herein.

BACKGROUND

With the advent of communications and media technology, users can readily create digital content that can have a global reach without significant expenditure. To disseminate such content, various software applications (e.g., mobile applications within smartphones) and associated backend systems have been developed to facilitate the uploading of content and sharing with other users. In particular, social networking services allow users to efficiently share relevant content, but provide little or no coordination for users to collaborate in generating content. Moreover, conventional user interfaces (UI) can be cumbersome for the users to navigate through the unsystematic presentation of voluminous content, resulting in user frustration and ultimately not using the mobile application.

SOME EXAMPLE EMBODIMENTS

Therefore, there is a need for an approach for promoting the creation and consumption of content in a coordinated, efficient manner, while providing the users with an effective UI to consume the content.

According to one embodiment, a method comprises receiving, via a user device, a first content including execution of a first activity, wherein the first content is to be presented in a first arrangement. The method also comprises receiving, via another user device, a second content including execution of a second activity. The method further comprises determining that the first activity and the second activity are a common activity, and generating a score of the first activity and the second activity based on feedback from a plurality of users. The method also comprises ranking the first content and the second content based on a determined score. The method further comprises organizing the first content and the second content for presentation in a second arrangement based on the ranking.

According to another embodiment, a system comprises a memory configured to store computer-executable instructions; and one or more processors configured to execute the instructions to receive, via a user device, a first content including execution of a first activity, wherein the first content is to be presented in a first arrangement. The one or more processors are further configured to execute the instructions to receive, via another user device, a second content including execution of a second activity. The one or more processors are further configured to execute the instructions to determine that the first activity and the second activity are a common activity, and to determine a score of the first activity and the second activity based on feedback from a plurality of users. The one or more processors are further configured to execute the instructions to rank the first content and the second content based on a determined score. The one or more processors are further configured to execute the instructions to organize the first content and the second content for presentation in a second arrangement based on the ranking.

According to another embodiment, an apparatus comprising at least one processor, and at least one memory including computer program code, the at least one memory and the computer program code configured to, with the at least one processor, cause the apparatus to generate content associated with execution of an activity. The apparatus is also caused to initiate communication with a content processing platform to upload the generated content. The apparatus is further caused to receive ranking information from the content processing platform in response to the uploaded content. The apparatus is further caused to display, via a user interface, the uploaded content among a plurality of content within a common category according to the ranking information, wherein the plurality of content is displayed according to a first orientation within the user interface, and other content associated with another category is displayed in a second orientation.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1C is a user interface diagram that represents a scenario wherein a user selects a video from the vertical arrangement to create similar content, according to one embodiment;

FIGS. 3A-3D are flowcharts of processes of the system of FIG. 1A, according to various embodiments;

DESCRIPTION OF PREFERRED EMBODIMENT

A method, system, and apparatus for facilitating a virtual competition for content creation and an effective UI for presenting content in an organized manner are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
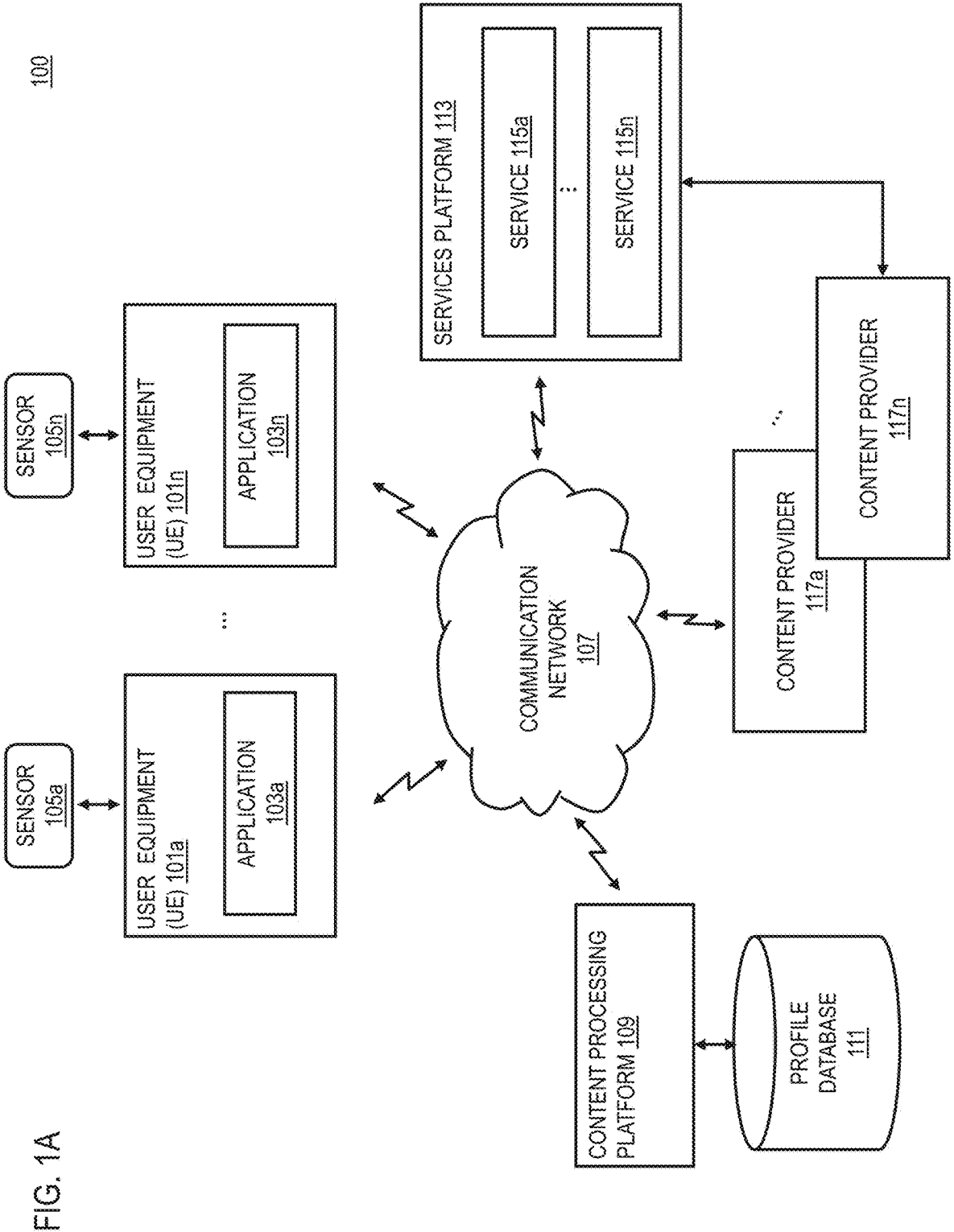
FIG. 1A is a diagram of a system capable of stimulating the generation of digital content as part of a virtual competition, according to one embodiment.

FIG. 1A is a diagram of a system capable of stimulating the generation of digital content as part of a virtual competition, according to one embodiment. As noted, the prevalence of smartphones (and other digital devices, e.g., tablets) has spawned the age of media content creation for all purposes, e.g., news, entertainment, instructional content, etc. Not surprisingly, content marketing has undergone a huge transformation, whereby video content (e.g., short-videos, video clips, etc.) has emerged as one of the most effective strategies to connect with consumers. Especially in the digital age, the features that come standard on most smartphones enable everyone to produce content—in effect, giving rise to the popularity of short videos (e.g., typically under 15 minutes in recording time). Such capability has changed the way users communicate with each other and how service providers seek new avenues to gain consumers. Conventionally, videos are generally discovered, e.g., users will search for a video on YouTube® or Google®, to learn how to do something (e.g., Do It Yourself (DIY)) or about something. Also, with social media platforms, such as Facebook®, Twitter®, and Instagram®, consumers are more likely to find a video when scrolling through their feeds. Whether consumers watch a particular video depends on the relevancy and engagement level of the video. Traditionally, content that is generated by users is independent in nature; that is, a user may generate content on a particular subject matter or category and simply posts such content and generally without regard or influence of what other users are creating. At best, the conventional platforms may organize the content in various categories without any mechanism to prompt or motivate the further generation of content; moreover, there lacks an effective mechanism to order such content with respect to the user experience.

To address these problems, system 100 of FIG. 1A introduces the capability to encourage users to generate content and to determine the position of the generated content with respect to other content. Thus, content generation can be interdependent among different users' and their associated content. According to various embodiments, a digital video recording of an activity performed or engaged by a particular user; such activity can be, e.g., a sports activity whereby the user attempts to make consecutive basketball free throws. The user can have this video uploaded by the system 100 and displayed in, for example, a vertical arrangement, which then provides a mechanism to encourage other users to compete or otherwise perform and record the same activity. The performances or versions of this activity are organized according to a scoring and ranking processes (which is further detailed below) and displayed via a UI accordingly. That is, the system 100 orders the videos during a presentation in certain positions—e.g., the "best" video holds the top position relative to other positions. The position determination mechanism is based on a ranking process to order the content as part of the representation of the content within a UI. For example, the representation or display can be according to a horizontal arrangement based on input/feedback of other users and/or a scoring mechanism. By way of example, such user input can be in the form of comments, likes, views, mentions, follow, shares, etc. It is contemplated that other arrangements of content can be utilized.

As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the content processing platform 109 via the communication network 107.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as social networking applications, content provisioning services, an internet browser, camera/imaging application, media player applications (e.g., music and/or video streaming, photo exchange, etc.), social networking applications, and the like. In one embodiment, one of the applications 103 at the UE 101 may act as a client for the content processing platform 109 and perform one or more functions associated with the functions of the content processing platform 109 by interacting with the content processing platform 109 over the communication network 107.

By way of example, the sensors 105 may be any type of sensors. In certain embodiments, the sensors 105 may include, for example, a network detection sensor for detecting wireless signals or network data, a camera/imaging sensor for gathering image data, receivers for different short-range communications (e.g., Bluetooth, WiFi, etc.), a global positioning sensor for gathering location data, and the like.

In one embodiment, communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network, e.g., the Internet, short-range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including 5G ($5^{th}$ Generation), 4G, 3G, 2G, Long Term Evolution (LTE), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the content processing platform 109 may be a platform with multiple interconnected components. The content processing platform 109 may include multiple servers, intelligent networking devices, computing devices, components, and corresponding software for facilitating a virtual competition for content creation and an effective UI for presenting content in an organized manner. In one embodiment, the content processing platform 109 receives content from UEs 101a, whereby the content (e.g., videos, images, audios, or a combination thereof) is a recording of an activity that is executed or performed by one or more individuals. Thereafter, the content processing platform 109 may display this content in, for example, a vertical arrangement and share with other users of the platform 109, to initiate a challenge among these users. According to one embodiment, these users are registered users of the platform 109. These other registered users may accept the challenge by creating similar content (e.g., performing the same activity as the original content) to "dethrone" or "one-up" the participants in the original content. By way of example, the best performer's content is displayed more prominently relative to other content containing the performance of the common activity in, for example, a horizontal arrangement. It is noted that the original content can be organized in a horizontal arrangement, while the best are in a vertical arrangement; in additional, other angled arrangements may be utilized. Subsequently, the content processing platform 109 receives, via the user device, a second content from other registered users participating in the activity.

Thereafter, the content processing platform 109 determines a degree of similarity between the first content and the second content. In one example embodiment, the degree of similarity is determined based on an image matching process. The content processing platform 109 then clusters the first content and the second content into one category based on the degree of similarity.

Then, the content processing platform 109 ranks the first content and the second content based on scores that are generated for each of the content. The content processing platform 109 determines the scores based on user inputs. In one embodiment, the user inputs comprise a number of likes, comments, views, shares, mentions, follow, or a combination thereof with respect to the first and second content. In one embodiment, the content processing platform 109 may determine the score for the first and second content by aggregating the user inputs received for the first and second content. In another embodiment, the content processing platform 109 may determine the score for the first and second content by applying weight information to the first and second content based on a ratio of the number of positive comments to the number of negative comments, the number of likes to the number of dislikes, or a combination thereof. A higher number of positive comments and likes are associated with greater weight and a higher rank. Thereafter, the content processing platform 109 compares the weight information to the aggregated user inputs.

Next, the content processing platform 109 organizes the first and second content in a horizontal arrangement, i.e., the horizontal axis of a user interface, based on the determined score. Content with a higher score is ranked before the content with a lower score. Subsequently, the content processing platform 109 presents the selected first content and the second content in the horizontal arrangement of a user interface of the UE 101. In one example embodiment, a user may post a short video of a simple basketball trick-shot titled "trick-shot." System 100 presents the video in a vertical arrangement and shares the video with the other users, whereupon the other users can either choose to like, comment, share, scroll to another category, or click the compete button, e.g., a "one-up" button, to perform and record the basketball trick-shot and challenge the original content. As users continue to create basketball trick-shot videos, these videos are chained together horizontally. The registered users may swipe horizontally, e.g., either right or left, to see the chain of basketball trick-shot videos. The ranking is based on the number of likes, comments, shares, or follows, thereby creating a pseudo voting mechanism. In one example embodiment, content processing platform 109 may highly rank a basketball trick-shot video, e.g., first position, in the horizontal arrangement because the video has the highest score, e.g., the highest number of likes and comments. In one example embodiment, content processing platform 109 may lowly rank, e.g., the last position, another basketball trick-shot video in the horizontal arrangement because the video has the lowest score, i.e., the lowest number of likes and comments. Such competitive flair in the ranking of the content based on popularity encourages users to post new and qualitative content.

In one embodiment, the content processing platform 109 may include or have access to a profile database 111 to access or store any kind of data, such as user preference information, historical user information, content, e.g., audio, video, images, etc., associated with the users, contextual information, etc. The data stored in profile database 111 may, for instance, be provided by the UE 101, the service platform 113, services 115, or content providers 117. In one embodiment, the content processing platform 109 may query profile database 111 for content that corresponds to the newly added/received content.

The services platform 113 may include any type of service. By way of example, the services platform 113 may include social networking services, content (e.g., audio, video, images, etc.) provisioning services, application services, storage services, contextual information determination services, etc. In one embodiment, the services platform 113 may interact with the UE 101, the content processing platform 109, and the content providers 117 to supplement or aid in the processing of the content information. In another embodiment, the services platform 113 may provide the content processing platform 109 with user preference information, contextual information, etc., to assist the content processing platform 109 in determining relevant content for at least one registered user.

By way of example, services 115 may be an online service that reflects the interests and/or activities of users. In one scenario, the services 115 provide representations of each user (e.g., a profile), his/her social links, and a variety of additional information. The services 115 allow users to share activities information, contextual information, and interests within their individual networks, and provides for data portability.

The content providers 117 may provide content to the UE 101, the content processing platform 109, and the services 115 of the services platform 113. The content provided may be any type of content, such as textual content, audio content, video content, image content, etc. In one embodiment, the content providers 117 may provide content that may supplement the content of the applications 103, the sensors 105, or a combination thereof. By way of example, the content providers 117 may provide content that may aid the content processing platform 109 in determining suitable content for at least one registered user. In one embodiment, the content providers 117 may provide content that may aid the content processing platform 109 in identifying one or more content with regards to a registered users' preferences, activities, or a combination thereof. In another embodiment, the content providers 117 may also store content associated with the UE 101, the content processing platform 109, and the services 115 of the services platform 113. In a further embodiment, the content providers 117 may manage access to a central repository of data, and offer a consistent, standard interface to user's data.

By way of example, content processing platform 109, the services platform 113, services 115, UE 101, and/or content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header, and a transport (layer 4) header, and various application (layer 5, layer 6 and layer 7) headers as defined by the OSI Reference Model.

Figure 1B:
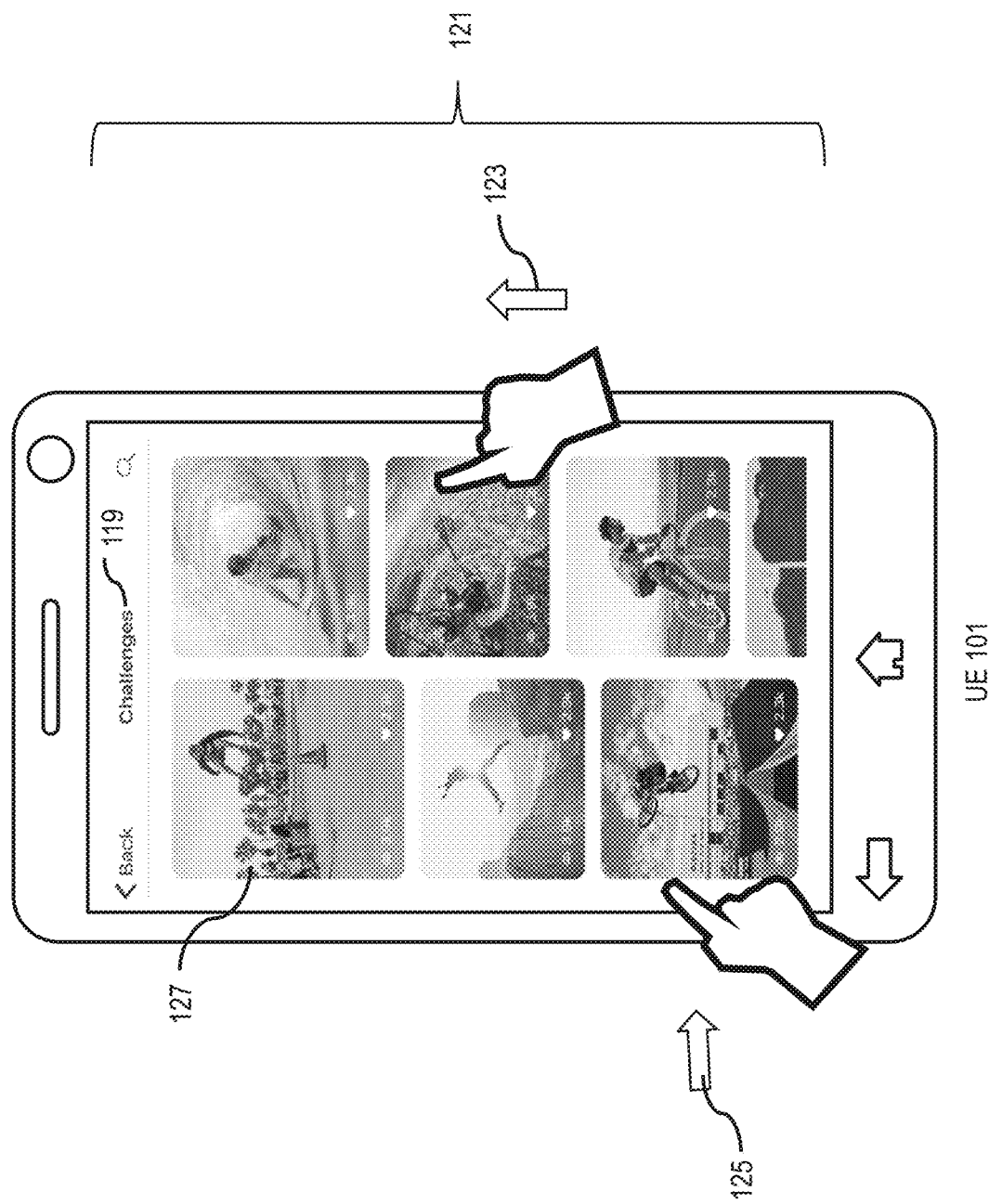
FIG. 1B is a user interface diagram that represents a vertical arrangement of competing content in a user interface of a user device, according to one embodiment.
Figure 7A:
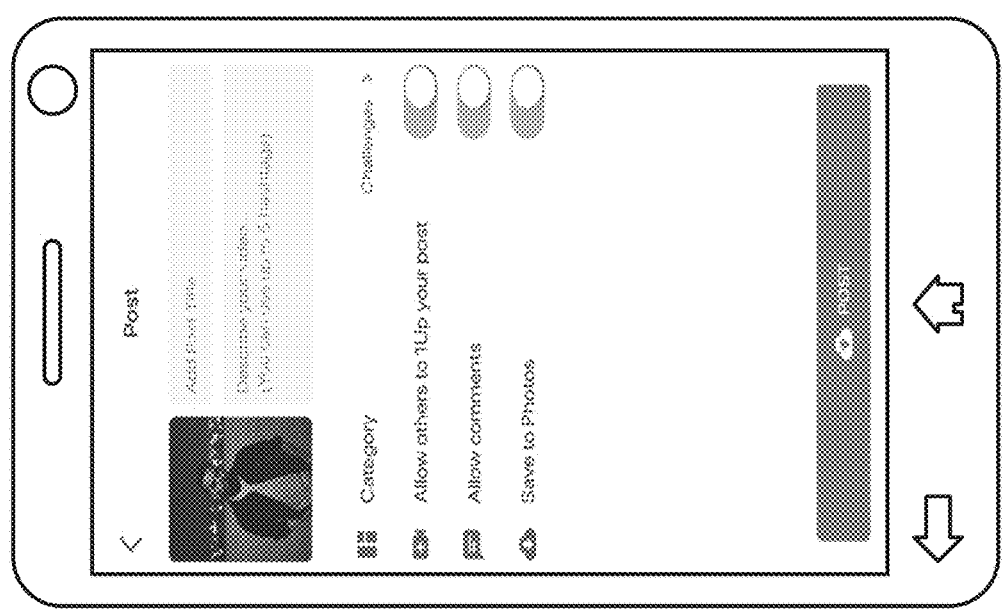
FIGS. 7A and 7B are user interface diagrams that represent a configuration interface for a newly created content, according to various embodiments.
Figure 7A:
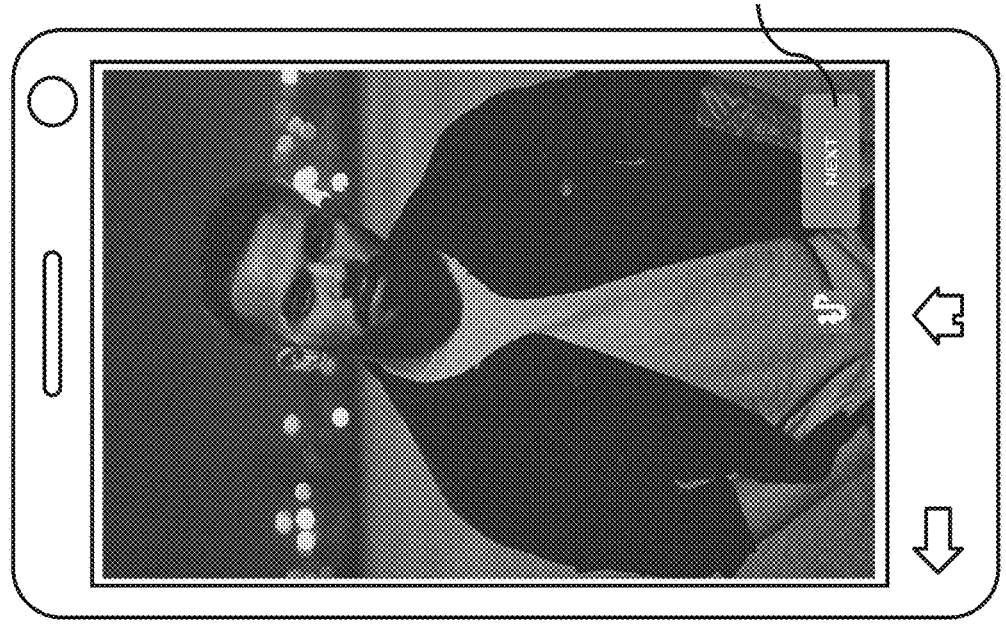

FIG. 1B is a user interface diagram that represents a vertical arrangement of competing content in a user interface of a user device, according to one embodiment. In one example embodiment, short-videos, e.g., videos of users performing various stunts, uploaded by the users are categorized by the content processing platform 109 as challenges 119 and are displayed in a vertical arrangement, e.g., list view 121. In one embodiment, the user while uploading the video may categorize the video as challenge videos (as depicted in FIG. 7A). In another embodiment, the content processing platform 109 may process the uploaded videos and automatically categorize the video as a challenge video, e.g., determining that the processed video is unique compared to other uploaded videos. The user can perform a vertical swipe 123, e.g., from bottom to the top of the screen, to peruse through the competing content. In another embodiment, a user can perform a horizontal swipe 125, e.g., from right to the left of the screen, to shift between categories.

FIG. 1C is a user interface diagram that represents a scenario wherein a user selects a video from the vertical arrangement to create similar content, according to one embodiment. In one example embodiment, a user decides to create similar content as the skateboarding trick-shot video 127 that was presented to him in the list view 121 of FIG. 1B. The user selects video 127 from the vertical menu 121, whereupon the user is presented with a full-screen display 129 of the trick-shot video 127 comprising a user interface element, e.g., challenge button 131. The user may participate in the competition by clicking the challenge button 131 to record a similar content, e.g., skateboarding trick-shot video 133, to "one-up" trick-shot video 127. As depicted in FIG. 1C, once the trick-shot video 133 is uploaded, the content processing platform 109 chains it together with trick-shot video 127 and then presents in a horizontal arrangement 135. The first video in the horizontal chain 135 is the original trick-shot video 127 and the subsequent videos to the right are the videos comprising of similar activities, e.g., trick-shot video 133. The trick-shot video 133 can replace the original trick-shot video 127 from its position as it garners more likes, comments, views, or shares.

Figure 1D:
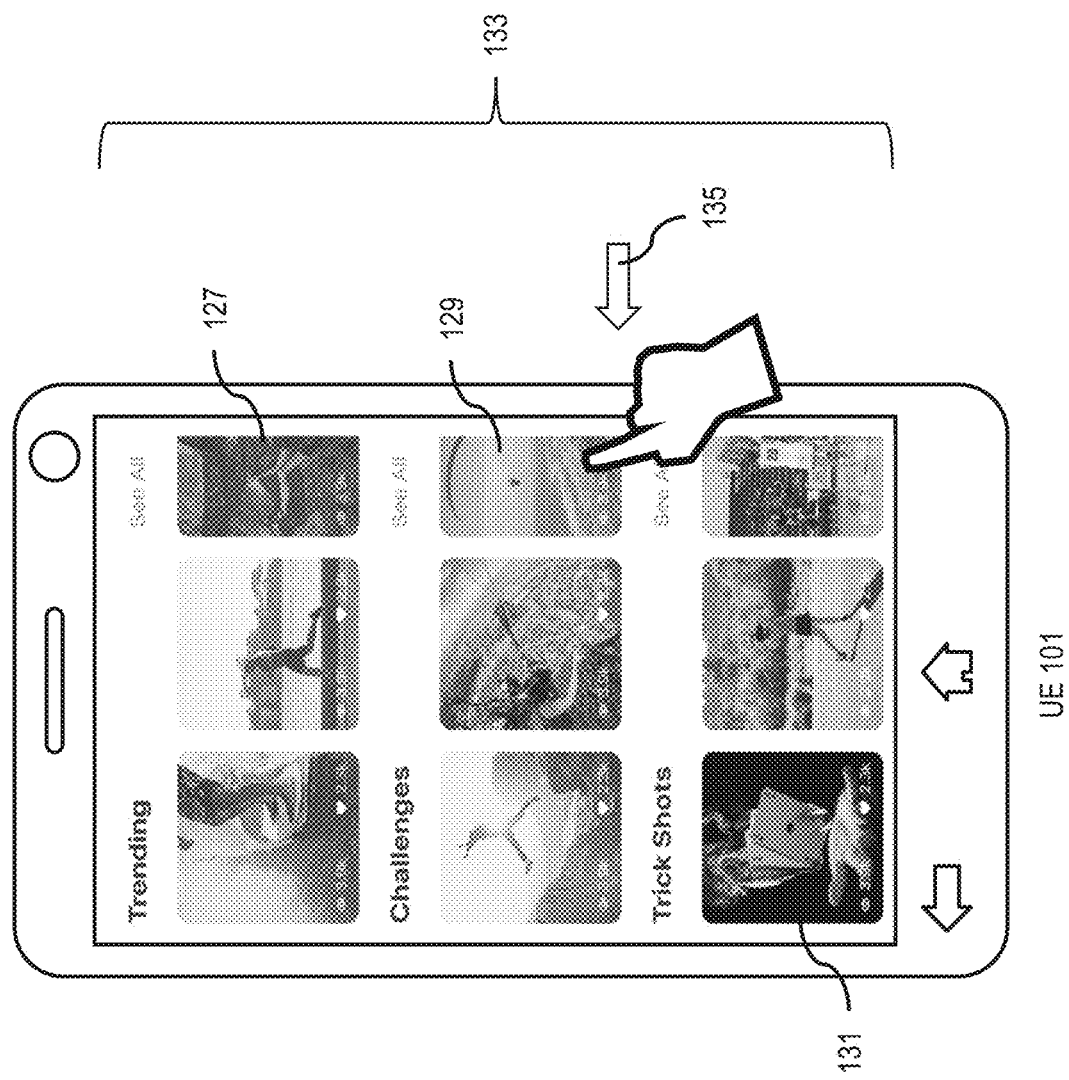
FIG. 1D is a user interface diagram that represents horizontal arrangements of competing content in a user interface of a user device, according to one embodiment.

FIG. 1D is a user interface diagram that represents horizontal arrangements of competing content in a user interface of a user device, according to one embodiment. In one example embodiment, short-videos, e.g., videos of users performing various tricks, uploaded by the registered users are classified by the content processing platform 109 into various categories, namely, trending 127, challenges 129, trick-shot 131, etc. In one embodiment, the user while uploading the video may categorize the video as a challenge video or a trick-shot video (as depicted in FIG. 7A). In another embodiment, the content processing platform 109 may process the uploaded videos and categorize the video as a challenge video or a trick-shot video, e.g., via image matching processes, video processing algorithms, etc. These categories of competing contents are then presented in a horizontally oriented menu 133. The registered user can perform a horizontal swipe 135, e.g., from right to the left of the screen, to peruse through the content of each category. The horizontal arrangements save a lot of screen space, rather than displaying the competing content at once in a very long page, horizontal layouts introduce users to smaller chunks of information, and allows users to see options within a category by swiping to the side.

Figure 2:
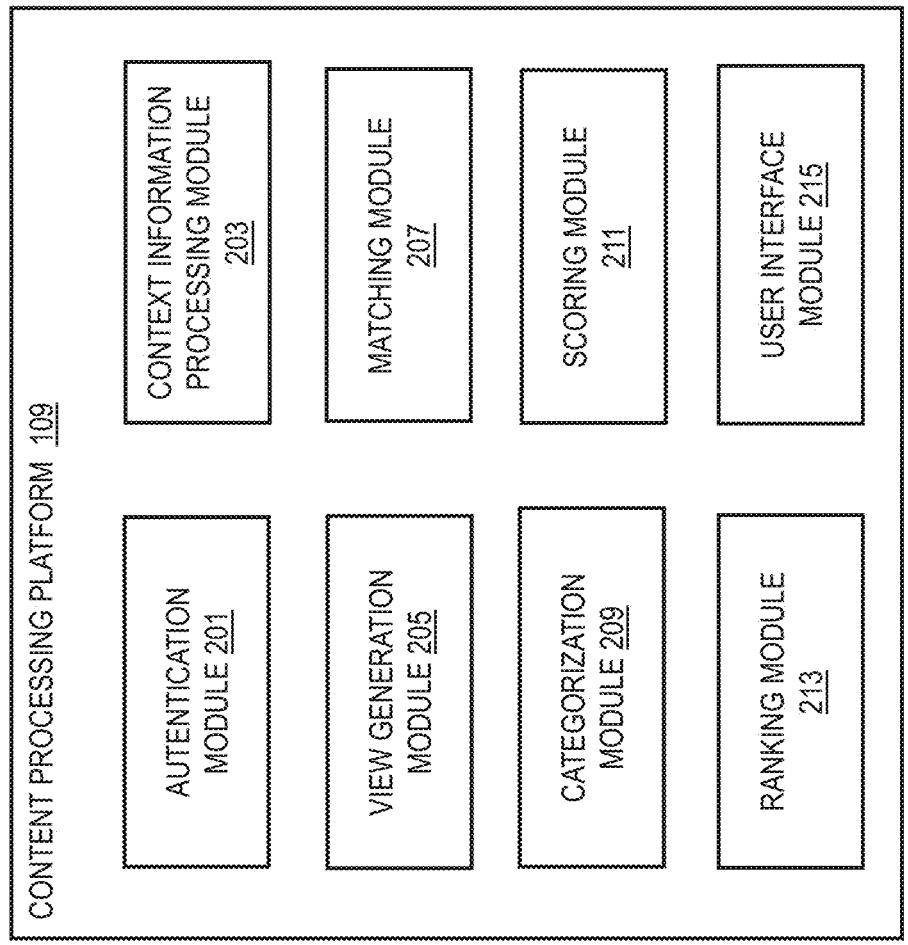
FIG. 2 is a diagram of the components of the content processing platform in the system of FIG. 1A, according to one embodiment.

FIG. 2 is a diagram of the components of the content processing platform in the system of FIG. 1A, according to one embodiment. By way of example, content processing platform 109 may include an authentication module 201, a context information processing module 203, a view generation module 205, a matching module 207, a categorization module 209, a scoring module 211, a ranking module 213, and a user interface module 215. It is contemplated that the functions of these components may be combined in one or more components or performed by other components of equivalent functionality.

In one embodiment, the authentication module 201 authenticates users and UE 101 for interaction with content processing platform 109, the services platform 113, and service 115. It is noted that the authentication may include a first-time registration procedure for establishing one or more profile settings. In one embodiment, authentication may include receiving and validating a login name and/or user identification value as provided or established for a particular user during a registration process with the service provider. In one embodiment, the authentication procedure may also be performed through the automated association of the profile database 111 with an IP address, a carrier detection signal of a user device, mobile directory number (MDN), subscriber identity module (SIM) (e.g., of a SIM card), radiofrequency identifier (RFID) tag or other identifiers. These means of authentication reduces privacy concern related to data sharing services.

In one embodiment, the context information processing module 203 may be used to determine context information associated with at least one device, at least one registered user, or a combination thereof. By way of example, the context information may include historical user information, user preference information, or a combination thereof. Once received, the context information processing module 203 analyzes the context information to determine relevant content for at least one user. Based on this determination, the context information processing module 203 triggers the execution of the view generation module 205, which facilitates the querying/retrieval of relevant content for at least one user. In one embodiment, context information processing module 203 processes and/or facilitates a processing of contextual information of at least one UE 101 thereby assisting the content processing platform 109 in presenting relevant content to one or more users.

In one embodiment, matching module 207 retrieves a plurality of content from at least one device, at least one registered user, or a combination thereof. Thereafter, matching module 207 compares and evaluates the received content with the corresponding data record to determine a degree of similarity. In one embodiment, the matching module 207 may implement an image matching process to compare and evaluate competing content for similarity. In accordance with an embodiment, the image matching process may correspond to a grid point matching. In another embodiment, the matching module 207 may implement an automatic video post-processing method that extracts metadata from sequences of video frames to determine similarity. In one example embodiment, video frames are a sequence of still images that are captured (or displayed) at a different time.

For example, the matching module 207 may receive a plurality of content, e.g., video of users performing a simple basketball trick shot. The matching module 207 may analyze the content by comparing and evaluating it with the corresponding data record, i.e., original basketball trick-shot video in the database, to determine a match. In one embodiment, the matching module 207 may utilize one or more algorithms, e.g., machine learning algorithms, to determine a match for the content based, at least in part, on the comparison. Based on this matching, categorization module 209 is triggered to cluster similar content in the same category.

In one embodiment, scoring module 211 may process user inputs for each of the competing content in a category to determine a score. In one embodiment, user inputs comprise likes, comments, views, shares, mentions, followers, or a combination thereof, with respect to each of the competing content in a category. In one embodiment, the scoring module 211 may aggregate user inputs for each of the competing content to determine a score. In another embodiment, the scoring module 211 may apply weight information to the user inputs, and then compare the applied weight information to the aggregated user inputs to generate a score, e.g., the number of positive comments on content is associated with a greater weight than the number of likes.

In one embodiment, ranking module 213 may rank the competing content within a category based, at least in part, on the scoring. In one example embodiment, the ranking module 213 may rank a video first in the horizontal arrangement because the video has the highest score, e.g., the highest number of likes and comments. In another example embodiment, the ranking module 213 may rank a video last in the horizontal arrangement because the video has the lowest score, e.g., the lowest number of likes and comments. In another embodiment, the ranking module 213 may penalize a video by downgrading its position in the horizontal arrangement for receiving negative feedback from the users, e.g., an increasing number of negative comments, an increasing number of dislikes, etc.

The volume of content, e.g., video, images, etc., that is available for viewing is rapidly increasing, and the service providers are arbitrarily displaying these content without considering user preferences. Consequently, it is difficult for users to find relevant content. Conventional UI designed to control the position of the displayed content often result in complicated key sequences and menu hierarchies that must be memorized by the user. Accordingly, it has become desirable to allow users to control the content they view. Furthermore, there is a substantial need for a relatively simplified content control system with a high degree of flexibility. In one embodiment, the user interface module 215 enables the presentation of a user interface for displaying original content in a vertical arrangement (as depicted in FIG. 1B). In another embodiment, the user interface module 215 enables the presentation of a user interface for displaying the selected original content and the competing similar content in a horizontal arrangement (as depicted in FIG. 1C). The user interface module 215 employs various application programming interfaces (APIs) or other function calls corresponding to the applications 103 of UE 101, thus enabling the display of graphics primitives such as menus, buttons, data entry fields, etc., for generating the user interface elements. Still further, the user interface module 215 may be configured to operate in connection with augmented reality (AR) processing techniques, wherein various applications, graphic elements, and features may interact.

The above-presented modules and components of the content processing platform 109 can be implemented in hardware, firmware, software, or a combination thereof. Though depicted as a separate entity in FIG. 1A, it is contemplated that the content processing platform 109 may be implemented for direct operation by respective UE 101. As such, the content processing platform 109 may generate direct signal inputs by way of the operating system of the UE 101 for interacting with the applications 103. In another embodiment, one or more of the modules 201-215 may be implemented for operation by respective UEs, the content processing platform 109, or combination thereof. Still further, the content processing platform 109 may be integrated for direct operation with services 115, such as in the form of a widget or applet, in accordance with an information and/or subscriber sharing arrangement. The various executions presented herein contemplate any and all arrangements and models.

FIGS. 3A-3D are flowcharts of processes of the system of FIG. 1A, according to one embodiment. The process 300 of FIG. 3A determines the position or ordering for competing content, according to one embodiment. In one embodiment, the content processing platform 109 performs the process 300 and is implemented in, for instance, a chip set including a processor and a memory as shown FIG. 9.

In step 301, content processing platform 109 receives, via a user device, a first content including execution of a first activity, wherein the first content is presented in a vertical arrangement. In one embodiment, the first content comprises of videos, images, audios, or a combination thereof. In one example embodiment, a user performs a first activity, e.g., a content creating activity, and creates a short video, e.g., tennis trick-shot videos. The user then uploads the video in a content sharing platform, whereupon the content processing platform 109 organizes the video in a vertical arrangement. Thereafter, the vertical arrangement of the content is presented to other users, and the other users may create similar competing content.

In step 303, content processing platform 109 receives, via another user device, a second content including execution of a second activity. The video-sharing platform creates a virtual competition amongst users, thereby encouraging the users to watch the shared video and then attempt to create similar and better content for more likes, comments, shares, views, and follows. The competition is considered "virtual" in a sense that the competition need not be organized at a common physical location or venue; the competition is thus organized via the content processing platform 109. In one embodiment, the second content include videos, images, audios, or a combination thereof similar to the first content.

In step 305, content processing platform 109 determines that the first activity and the second activity are a common activity; that is, in the same competitive category. In one example embodiment, the content processing platform 109 compares and evaluates the first activity and the second activity to determine a degree of similarity. In one example embodiment, the content processing platform 109 may implement an image matching process or an automatic video post-processing method to determine that the first activity and the second activity are common. Various criteria can be applied to determine whether two activities are similar; e.g., the images involve the same equipment, objectives, etc.

A score is generated for each of the activities, per step 307, based, in part, on user feedback. In one embodiment, user inputs comprise a number of likes, comments, views, shares, mentions, follows, or a combination thereof, with respect to each competing content. In one embodiment, a UI (e.g., as provided by user equipment 101*a*) enables a user to chain videos in a horizontal arrangement according to different parameters. In one example embodiment, a parameter is based on popularity, e.g., the number of likes, comments, shares, views, etc. The content processing platform 109 may aggregate user inputs for each of the competing content to determine a score. The content processing platform 109 may also apply weight information to the user inputs, and then compare the applied weight information to the aggregated user inputs to generate a score, e.g., the number of positive comments on a content is associated with a greater weight than the number of likes. In one embodiment, content processing platform 109 can adjust the score to reflect the duration a user spends watching the video content. The content processing platform 109 may boost the score if users generally tend to watch the video for a longer duration, and may reduce the score if users watch the video for a shorter duration. In one embodiment, the content processing platform 109 can adjust the score to reflect the number of likes, views, and comments for video content. The content processing platform 109 may increase the score in real-time with an increase in the number of likes, views, and comments. In one embodiment, content with a higher score is ranked ahead of the content with a lower score. In one example embodiment, a user can respond to a posted video, e.g., tennis trick-shot videos, by creating a similar video. This newly created video may be ranked last in the horizontal arrangement because of the low score, i.e., least number of likes, views, comments, shares, or mentions. However, the video may obtain higher scores as the number of likes, views, comments, shares, or mentions increases. Subsequently, the video is ranked higher in the horizontal arrangement with an increase in the score. In step 309, content processing platform 109 ranks the first content and the second content based on the determined score. As explained in FIG. 3B, the platform 109, in one embodiment, utilizes a ranking criteria to assist with computing the score.

In step 311, content processing platform 109 organizes the first content and the second content for presentation in a horizontal arrangement based on the ranking. In one example embodiment, content with the highest score is positioned first in the horizontal arrangement whilst content with the lowest score is positioned last.

Figure 3B:
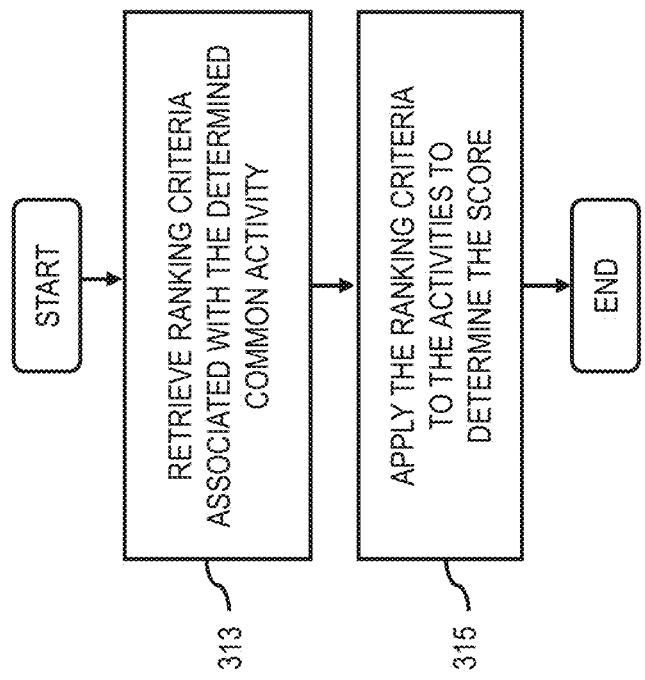

With respect to computing the score in one embodiment, the content processing platform 109 utilizes the ranking criteria associated with the determined common activity, per step 313 of FIG. 3B. The ranking criteria is then applied to the activities to determine the score (as in step 315). The ranking criteria can serve as a baseline for performing an activity; such baseline can be established through historical data of similar execution of such activity. For example, in a free throw shooting contest, the historical data may indicate that a certain number of consecutive of free throws is in the $90^{th}$ percentile; this threshold is employed to filter out performances in the initial instance.

As shown in FIG. 3C, the content processing platform 109 provides a reward account for a registered user, according to one embodiment. The user interface for this capability is depicted in FIGS. 7C-7E. Process 320 involves establishing user profiles and corresponding reward accounts or reward balances, as in step 321. The reward accounts can be linked to any financial system or institutions (e.g., banks, credit/debit card systems, etc.) as well as financial transaction systems, e.g., Venmo®, PayPal®, Zelle®, etc. The platform 109, as in step 323, assigns a reward credit to a category of activities; that is, to a particular competition. Continuing with the example of FIG. 3A, the platform 109 can determine that the first activity has a higher ranking than the second activity, per step 325. Assuming these two activities are the only ones in competition (for the sake of explanation), the platform 109 allocates the reward credit to the winning account, per step 327. In actuality, a competition can involve hundreds if not thousands of users.

Figure 3D:
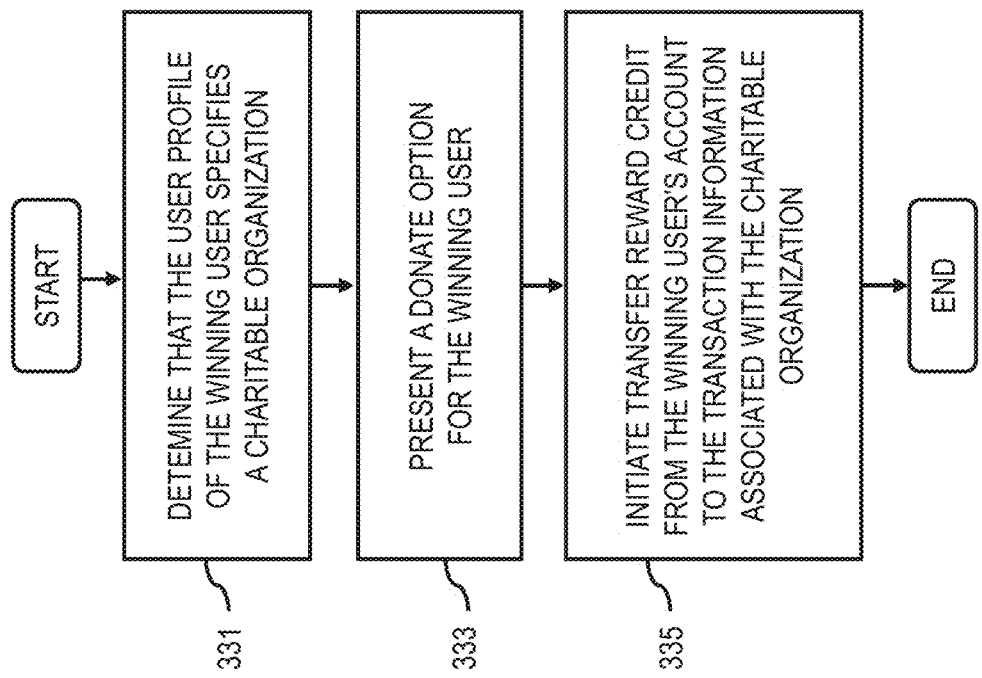
Figure 3E:
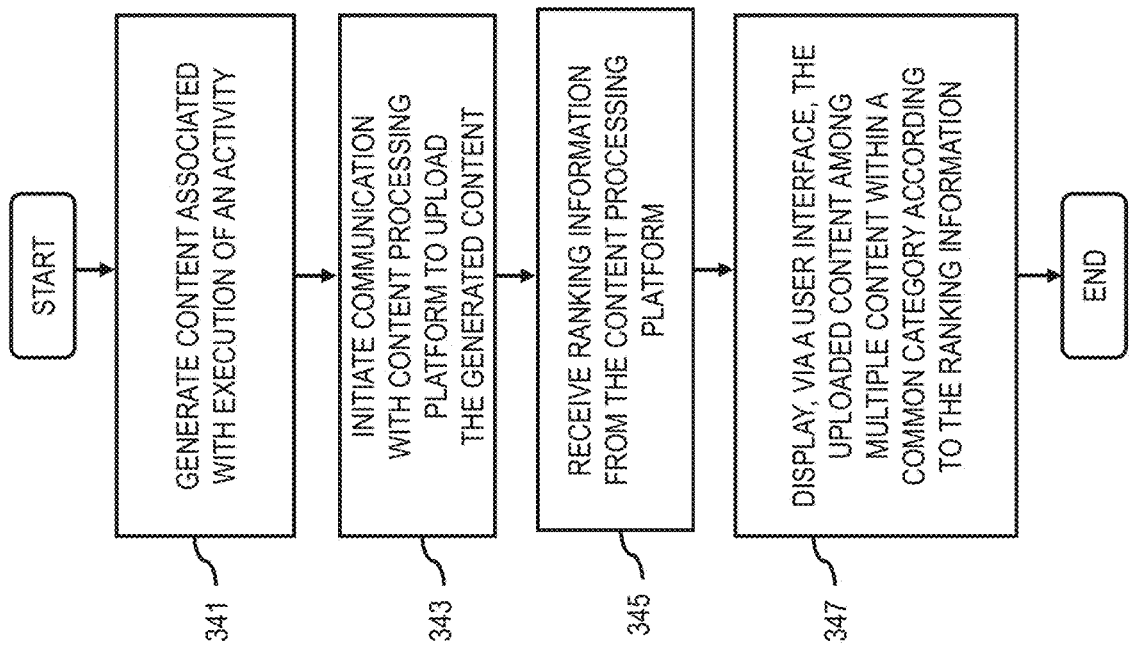
FIGS. 3E-3H are flowcharts of processes of the user equipment in the system of FIG. 1A, according to various embodiments.

According to various embodiments, the platform 109 provides a donation function, whereby a user may elect to send reward credits (e.g., money) to a charitable organization, as shown in FIG. 3D. Process 330 involves determining that a particular user has a user profile that specifies one or more charitable organizations (step 331); in this example, the user is assumed to have won some competitions to earn a positive balance in the associated reward account. This winning user is then presented, per step 333, with a donate option; as shown in FIG. 7E. Under this example, the user decides to contribute. In step 335, the content processing platform 109 initiates a transfer of the reward credit (e.g., money) to the charitable organization using certain transaction information (e.g., banking information of the charity).

FIGS. 3E-3H are flowcharts of processes of the user equipment in the system of FIG. 1A, according to various embodiments. From a user's perspective, once the application 103a is launched within UE 101a, as part of process 340, content can be generated for a particular competition, as in step 314. Thus, the user executes an activity associated with the competition and uploads the content, per step 343. In step 345, ranking information associated with the uploaded activity is received from the platform. Per step 347, the UE 101a displays, via the user interface of application 103a, the uploaded content among multiple content within a common category according to the ranking information.

Figure 3F:
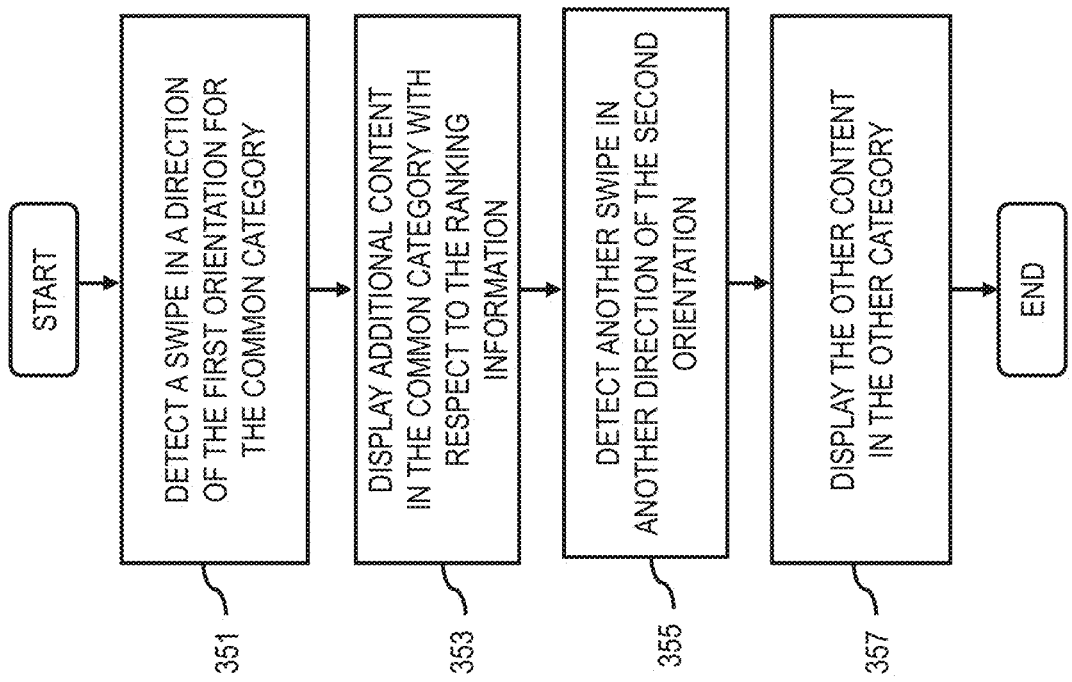

FIG. 3F shows a process 350 for navigating through content generated by various users. In step 351, UE 101a detects a swipe in in a direction of the first orientation for the common category. By way of example, the first orientation is vertical, and the second orientation is horizontal (as shown in FIGS. 1B and 1D). In step 353, additional content in the common category is displayed with respect to the ranking information. For instance, the highest ranked content can occupy the first position (e.g., most prominently displayed or easily accessed first), while the remaining ones are ordered accordingly. In step 355, another swipe is detected in another direction of the second orientation; this results in the other content in the other category being displayed (per step 357).

Figure 3G:
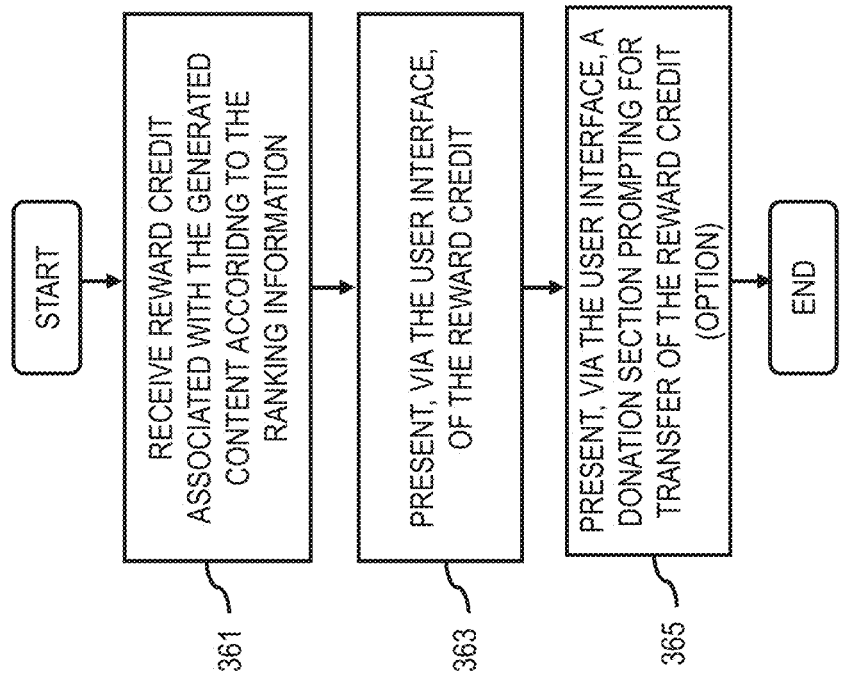

FIG. 3G depicts a process 360 in which the user can donate reward credits from the user's account. In step 361, the winning user receives a reward credit associated with the generated content according to the ranking information. That is, credits are provided to the user's reward account by the platform 109. Per step 363, the user can be presented or notified, via the user interface of UE 101a, of the reward credit. Moreover, the process 360 allows the user to donate the reward credit, in which a donation section is provided via the user interface to prompt for transfer of reward credit. In one embodiment, the user interface of FIG. 7E includes a "Donate!" section to initiate such action.

Figure 3H:
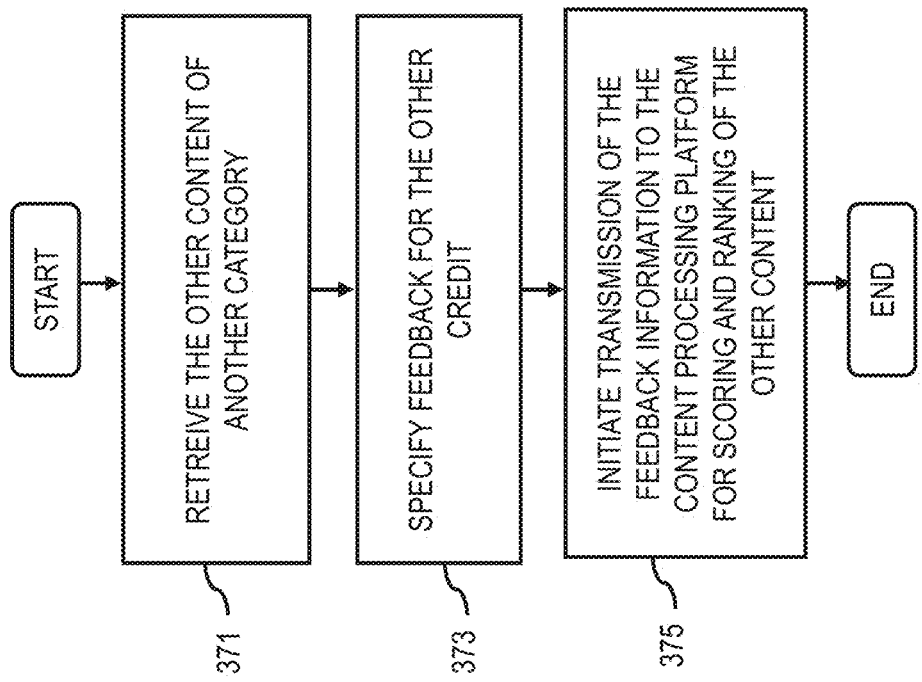

As described previously, the scoring and ranking of the user content (which is produced as part of a competition) is determined, in part or in whole, on user feedback. Continuing with the example of FIG. 3E, the user seeks to explore other competitions. As shown in FIG. 3H, the UE 101a, based on user input, retrieves the other content of another category (as in step 371). In this mode, the user can specify feedback information (e.g., likes, comments, etc.) for the other content (per step 373). In step 375, the application 103a initiates transmission of the feedback information to the content processing platform for scoring and ranking of the other content.

FIGS. 4A-4E are user interface diagrams that represent sign-up/log-in screens to access the content sharing service, according to various embodiments. In one example embodiment, a new/visiting user can create an account with the content sharing service by clicking tab 401, whereupon the user is navigated to an account creation page 403. In the account creation page 403, the user can enter his/her first name and last name for a personalized experience, and then click the sign-up tab 405. Subsequently, the user is directed to page 407 that requires the user to enter his/her valid email address, any unacceptable format of the email address will be rejected with a non-intrusive message, e.g., the entered email format is incorrect, please re-enter. Once the email is verified, the user is navigated to page 409 that requests the user to enter his/her date of birth. Once the date of birth is confirmed, the user is navigated to page 411 wherein the user is requested to enter his/her preferred username and password. Eventually, the user can click the sign-up tab 413 to create an account. The username and password are saved, and the user does not need to remember or type their usernames and passwords for future log-ins. This reduces the number of steps and increases the speed of the performance.

Figure 4A:
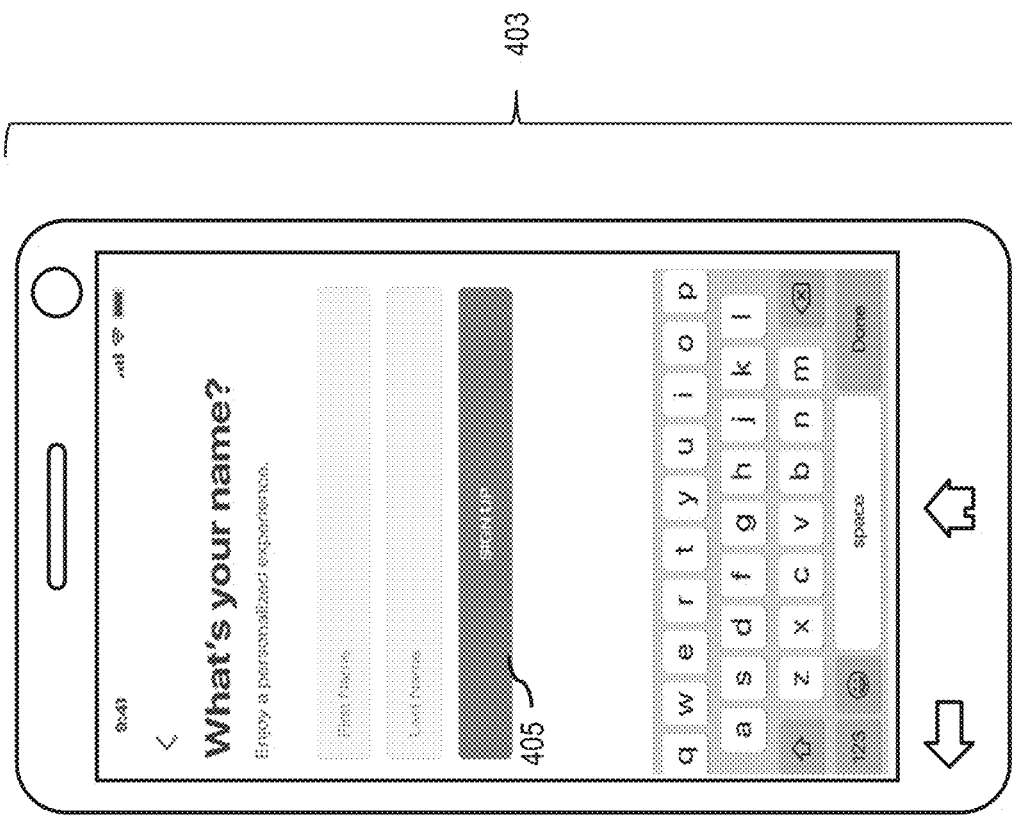
FIGS. 4A-4E are user interface diagrams that represent sign-up/log-in screens to access the content sharing service, according to various embodiments.
Figure 4A:
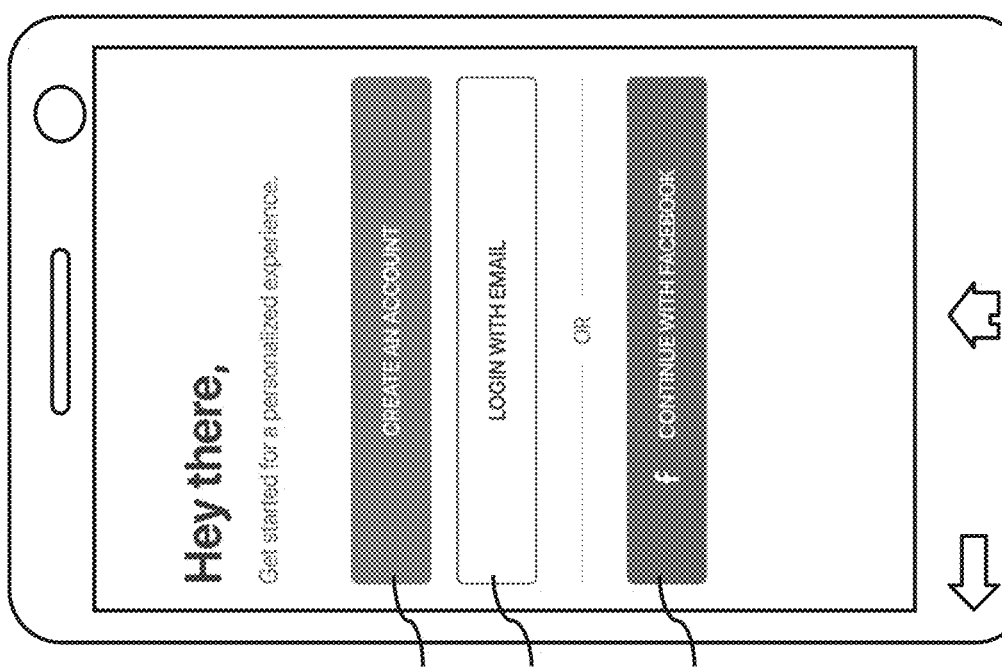
Figure 4B:
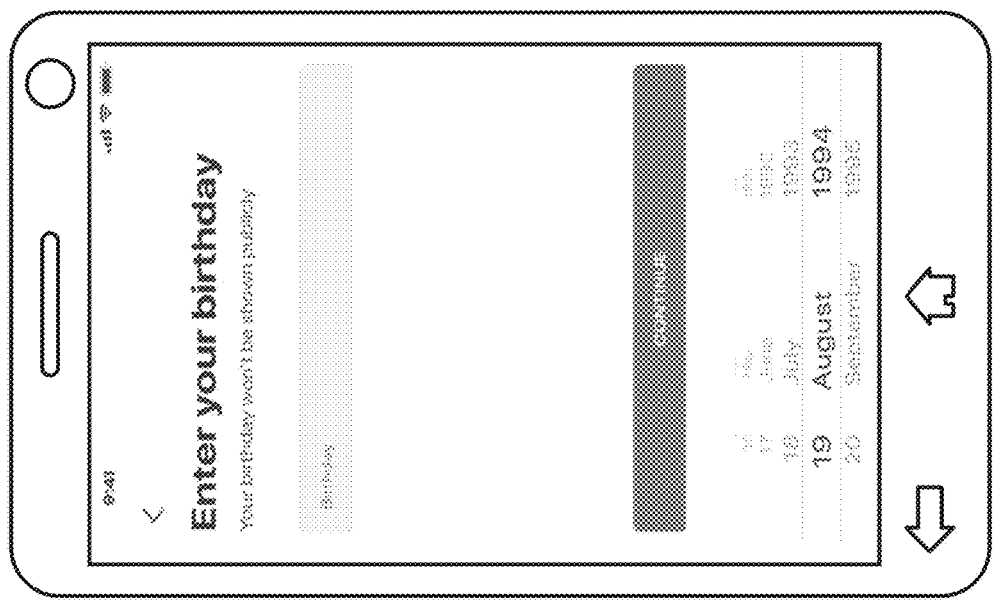
Figure 4B:
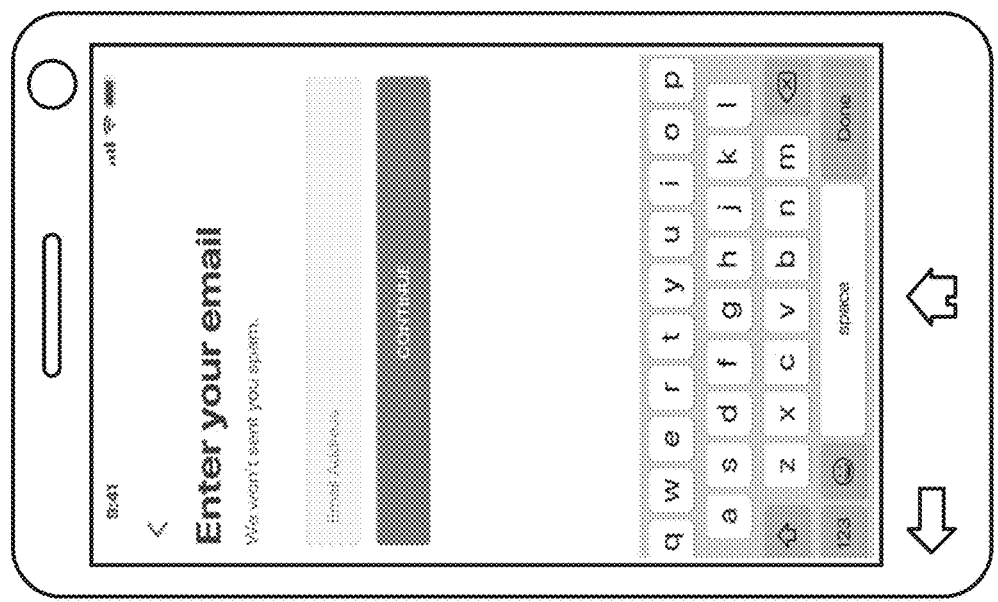
Figure 4C:
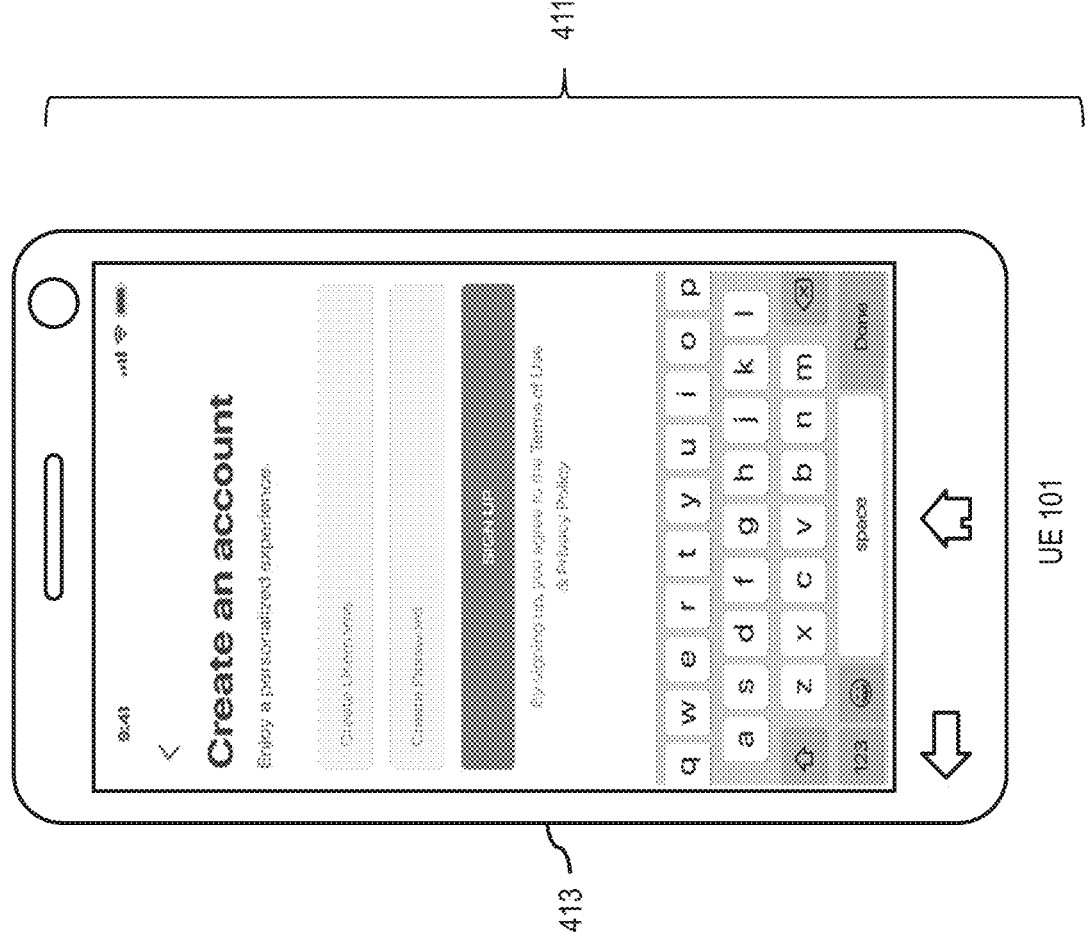
Figure 4D:
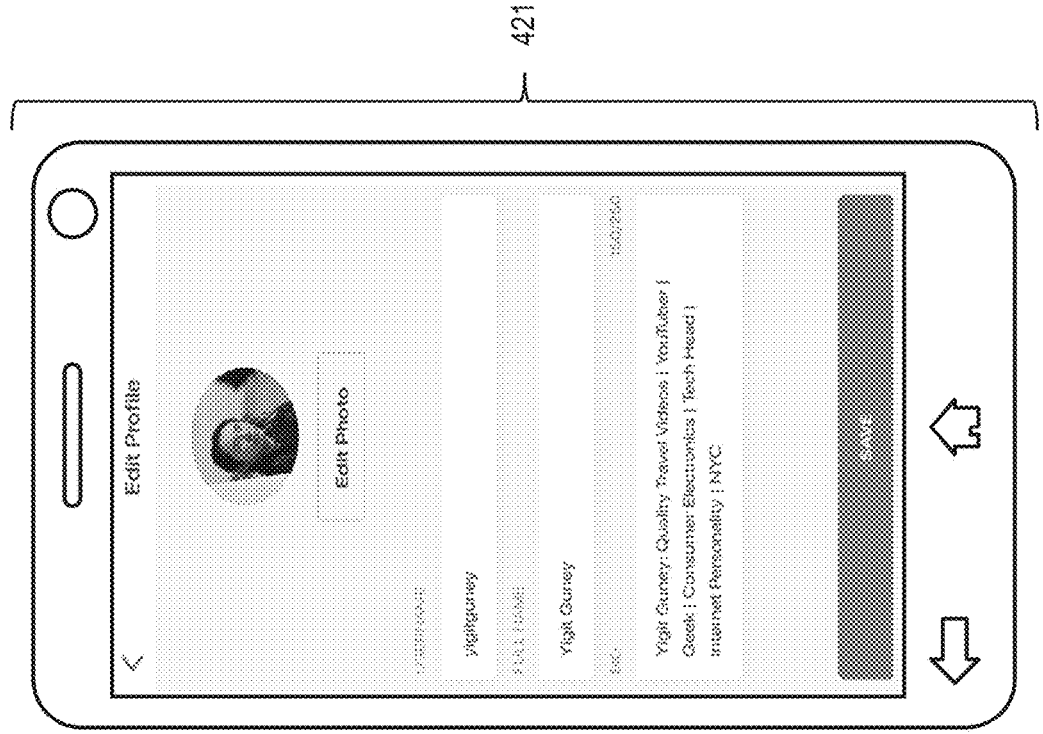
Figure 4D:
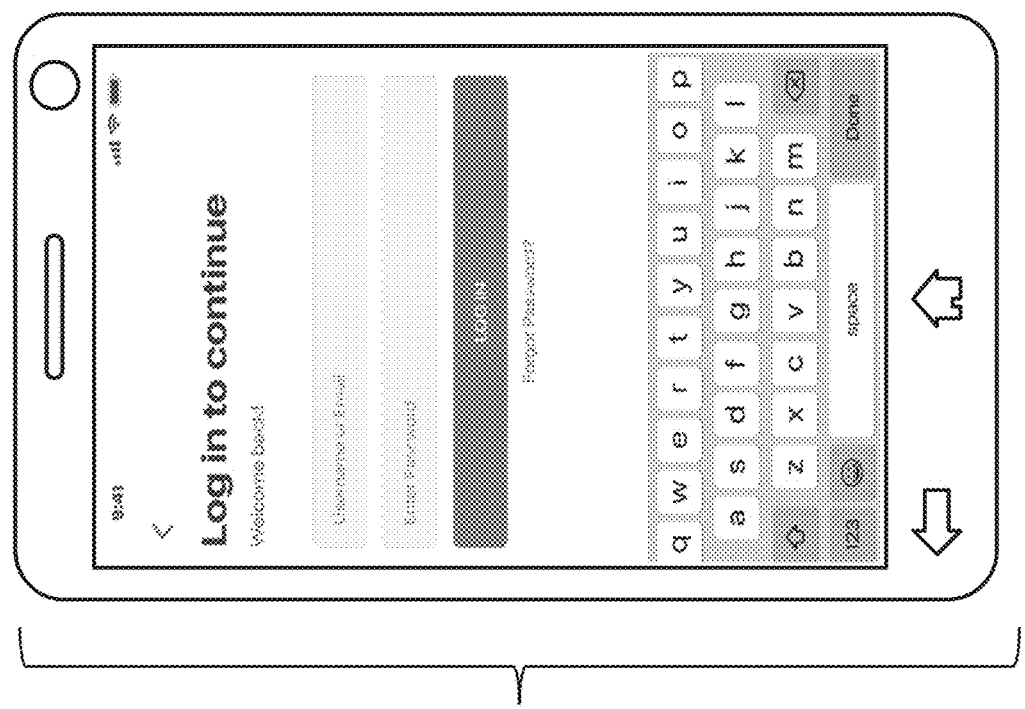
Figure 4E:
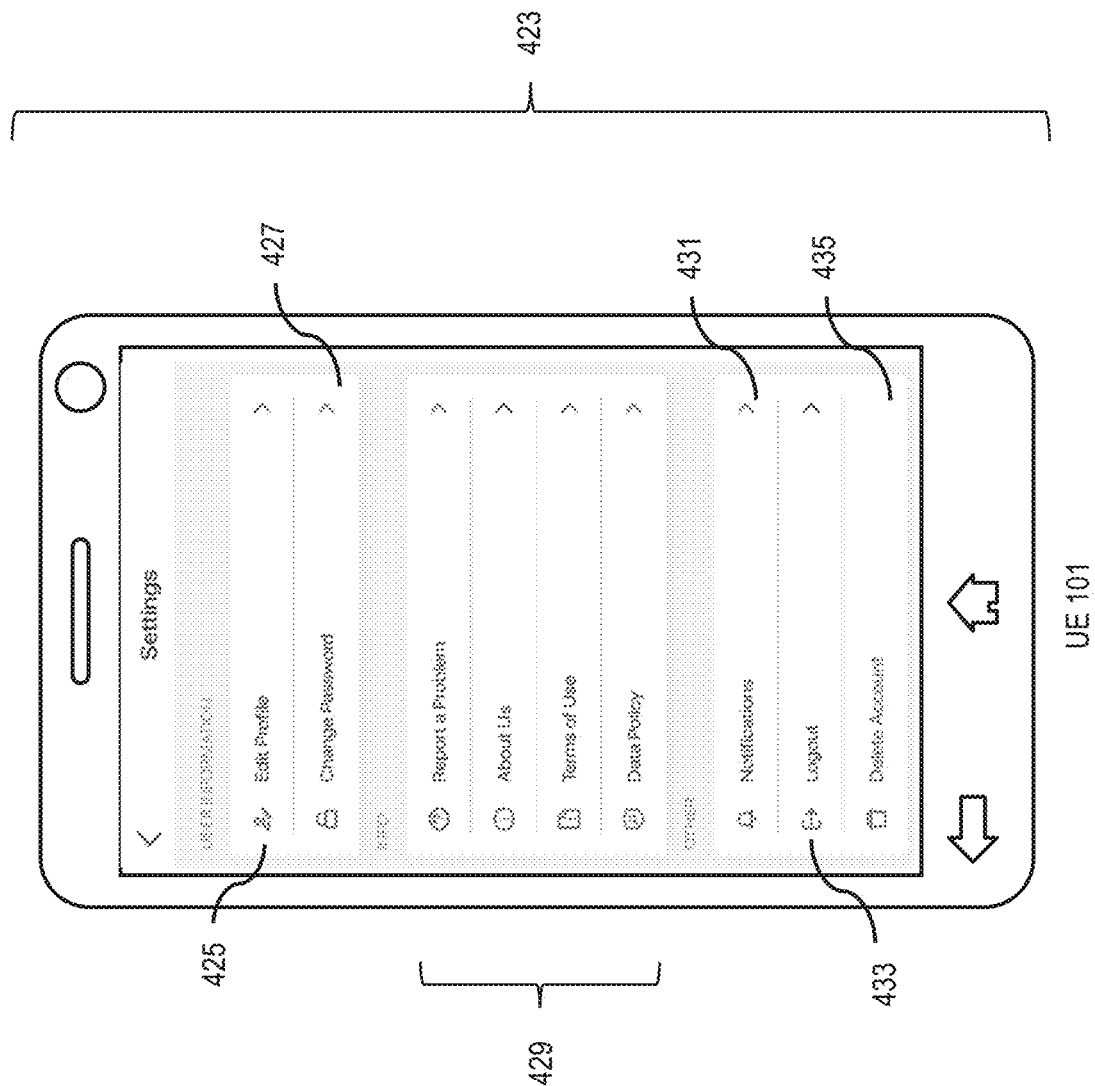

In another example embodiment, a returning user or a new user can use their email account, e.g., Google® account, to sign-in/log-in to the content sharing service by clicking tab 415. Subsequently, the user is directed to page 417 that requests the user to enter his/her email address and password. Once the email address and the password are authenticated, the user can access the content sharing service. The email address and the password are saved for future log-ins. In a further example embodiment, a returning user or a new user can use their social media account, e.g., Facebook® account, to sign-in/log-in to the content sharing service by clicking tab 419. Once the user is registered with the service, the user can create a profile, e.g., user interface 421 of FIG. 4D. The user may configure his/her profile via the settings page 423, as represented in FIG. 4E. The settings page 423 comprises of an edit profile tab 425, a change password tab 427, an info segment 429, a notification tab 431, a logout tab 433, and a delete account tab 435.

Figure 5A:
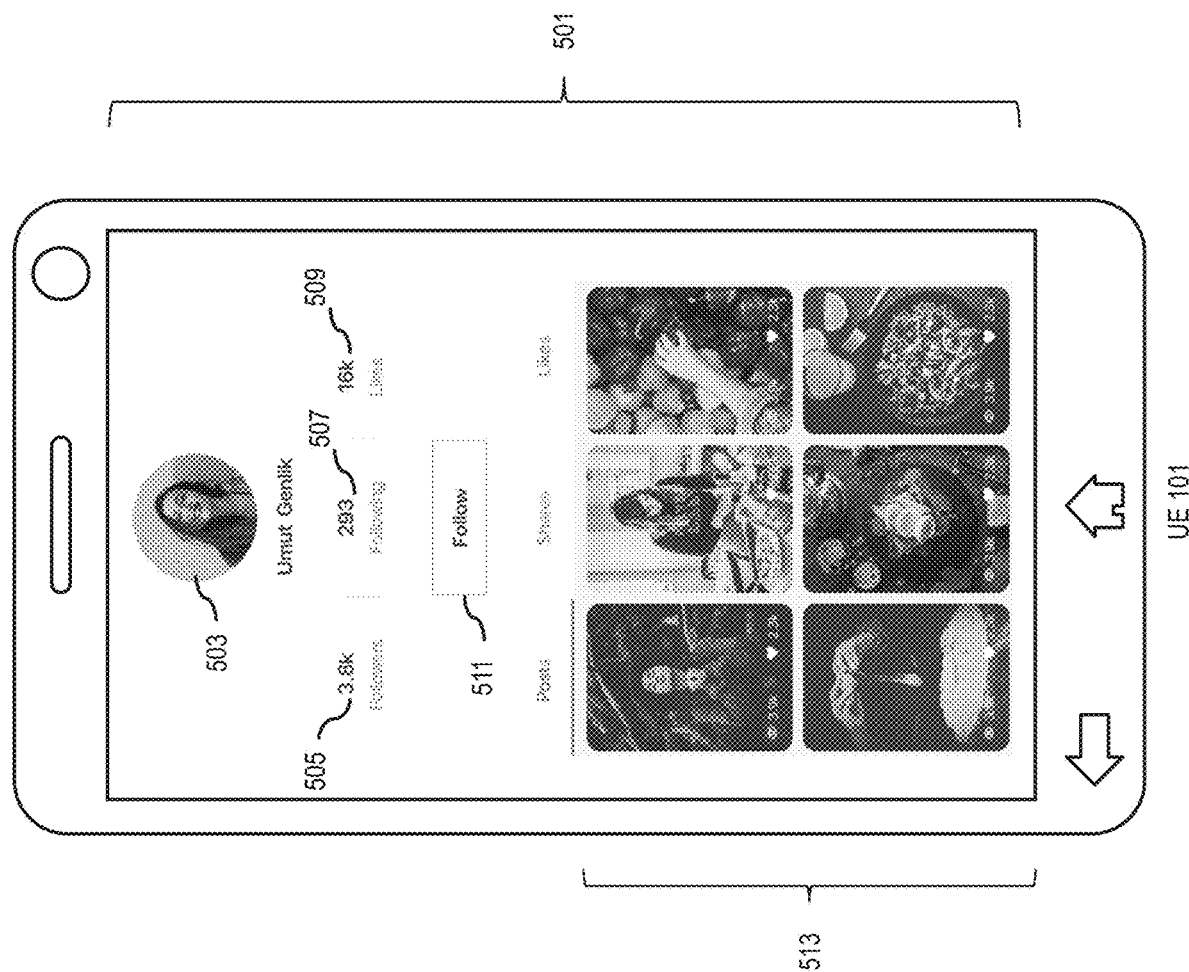
FIGS. 5A-5B are user interface diagrams that represent the profile of at least one registered user, according to various embodiments.
Figure 5B:
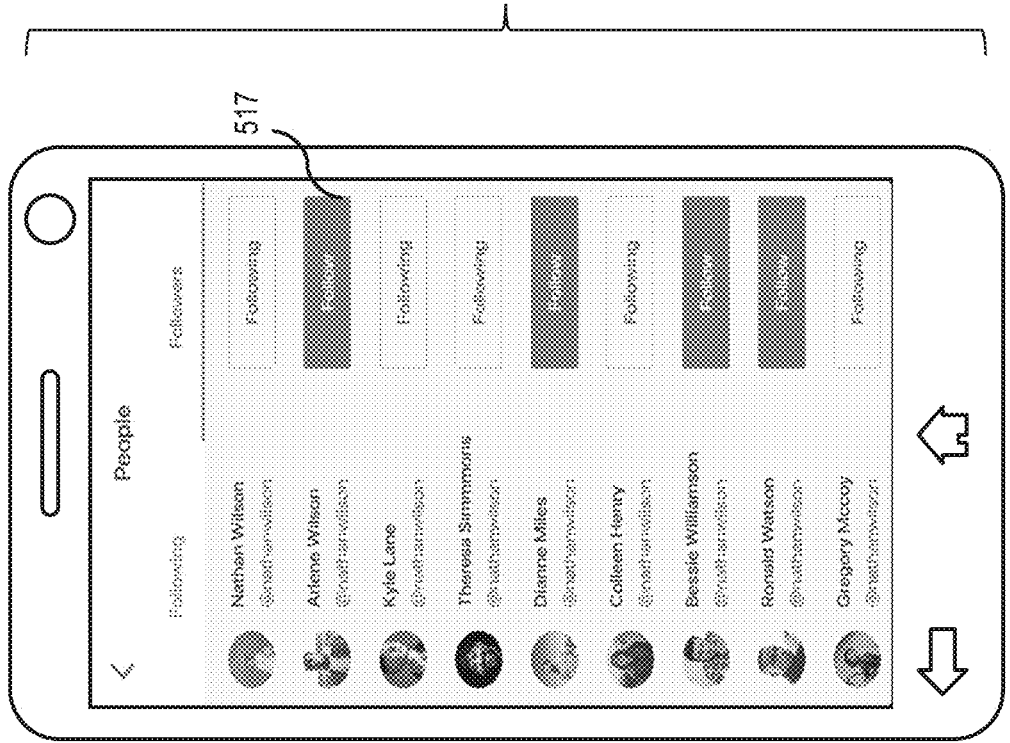
Figure 5B:
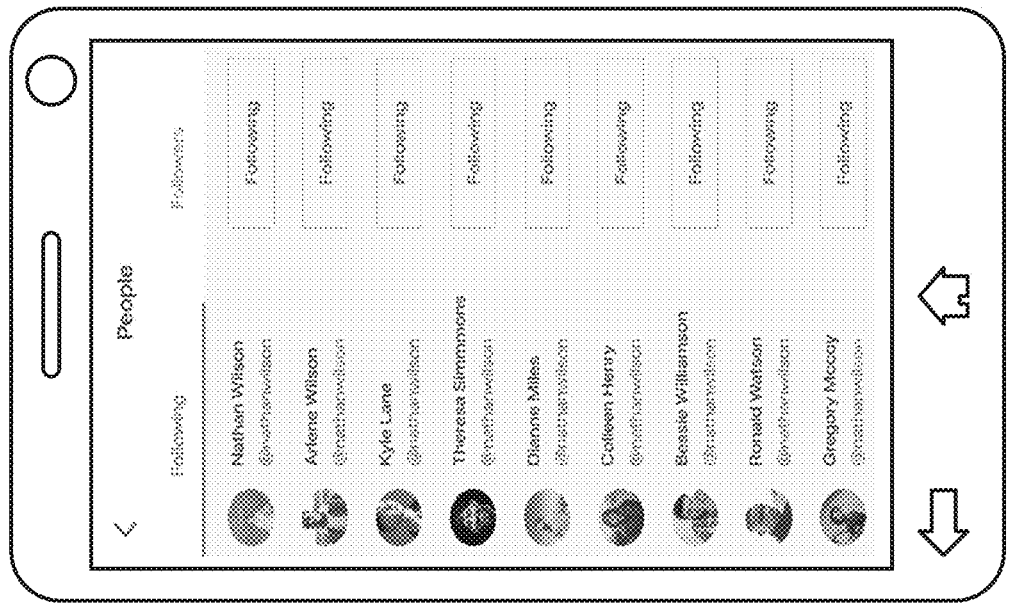

FIGS. 5A-5B are user interface diagrams that represent the profile of at least one registered user, according to various embodiments. As depicted in FIG. 5A, profile 501 of a registered user comprises of a profile picture 503, followers 505, following 507, likes 509, a follow tab 511, and the competing content section 513. FIG. 5B represents a vertical menu 515 displaying a list of followers for a registered user. The vertical menu 515 comprises a user interface element, i.e., follow tab 517, that allows the registered user to follow-back his/her followers.

Figure 6A:
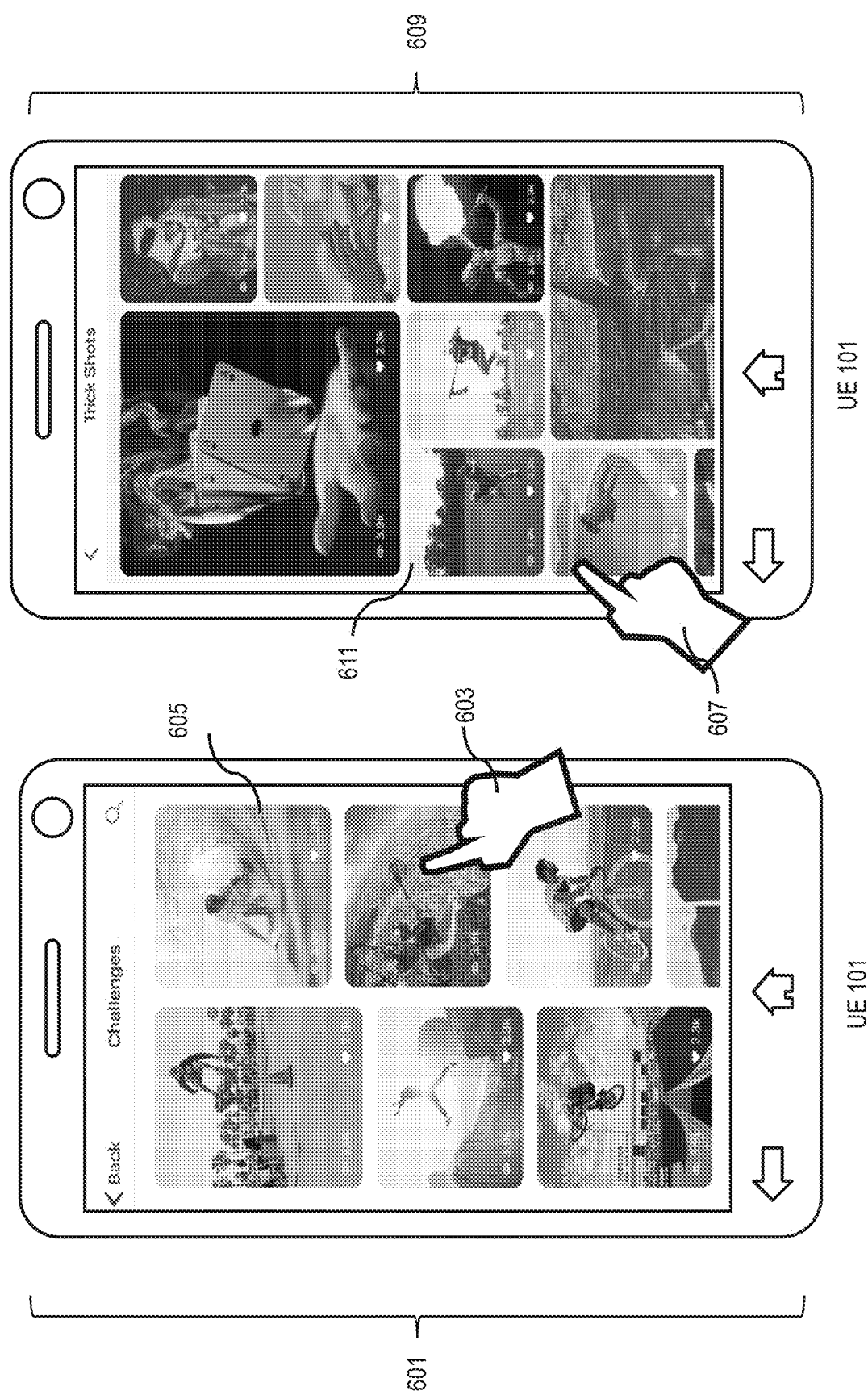
FIG. 6A is a user interface diagram that represents a display of original competing content in a vertical menu of a user interface of a user device, according to various embodiments.

FIG. 6A is a user interface diagram that represents a display of original competing content in a vertical menu of a user interface of a user device, according to various embodiments. Adverting to FIG. 6A, the original content is displayed in a vertical menu 601, and the users can browse through the content within a displayed category via a vertical swipe 603, e.g., bottom to the top swipe, to peruse through content 605. As depicted, contents 605 are prearranged in the vertical menu 601 based on the scores, e.g., number of views, likes, shares, and/or comments. In one embodiment, the user can switch to another category via a horizontal swipe 607, e.g., right to the left swipe, whereupon the user is navigated to vertical menu 609 comprising of new content 611 for a different category.

Figure 6B:
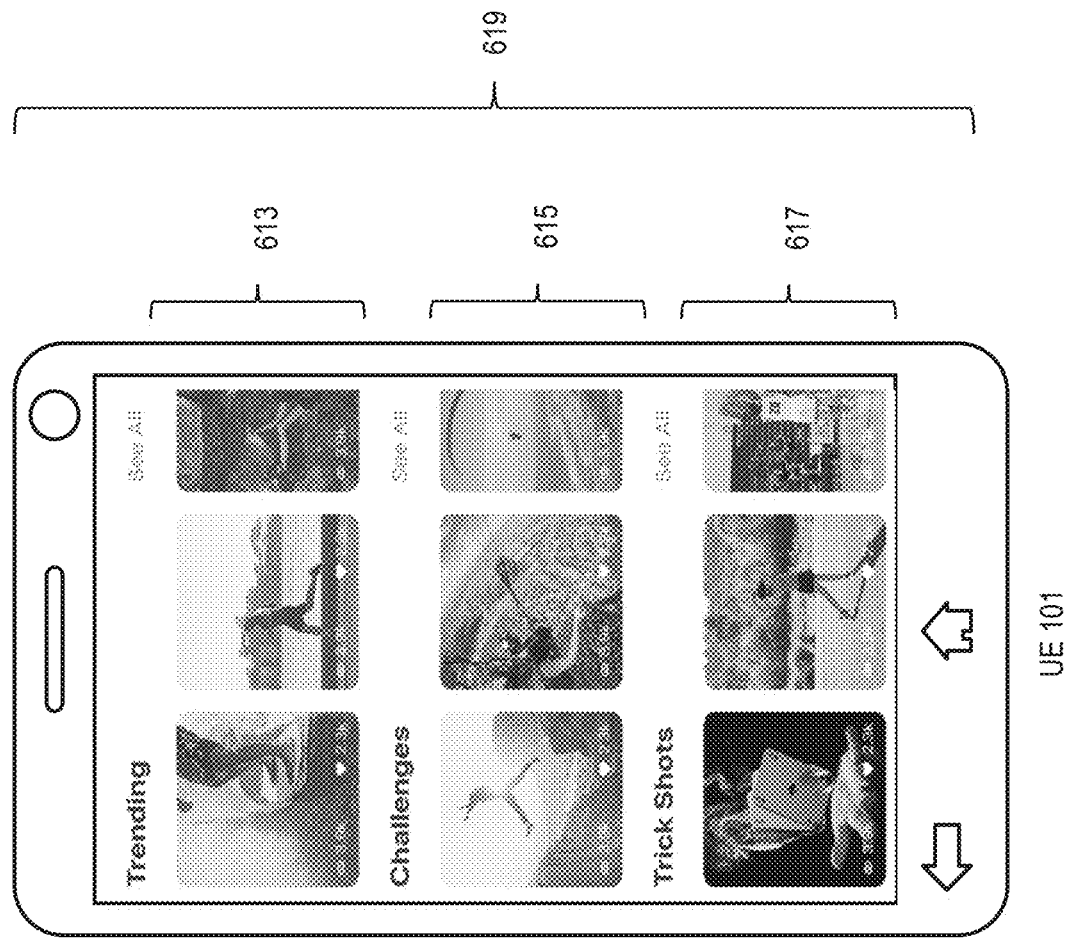
FIG. 6B is a user interface diagram that represents a display of competing content in a plurality of horizontal menu, according to various embodiments.

FIG. 6B is a user interface diagram that represents a display of competing content in a plurality of horizontal menu, according to various embodiments. In FIG. 6B, the uploaded content is parsed into different categories, e.g., trending 613, challenges 615, and trick-shots 617. The categorized content is then displayed in a horizontal menu 619. The users can browse through the contents within each category by swiping to the side, e.g., right to the left. The horizontal layouts of FIG. 6B introduces users to smaller chunks of information, rather than displaying all the content at once in a very long page. In one example embodiment, a user may select challenges 615 from the horizontal menu 619, whereupon the user is presented with a vertical menu for the selected category (as depicted in FIGS. 1B and 6A).

Figure 6C:
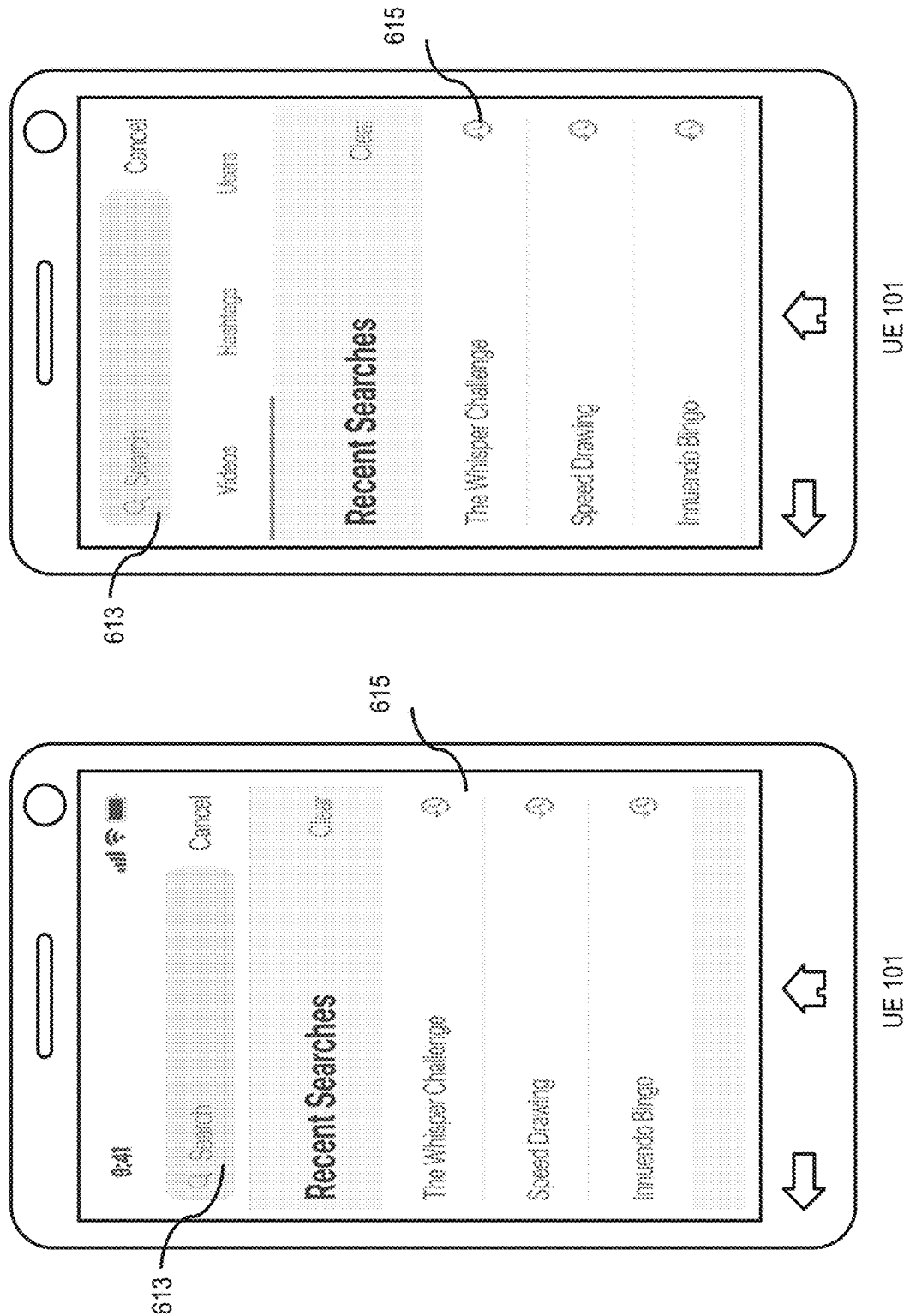
FIG. 6C is a user interface diagram that represents a search history for at least one registered user, according to various embodiments.

FIG. 6C is a user interface diagram that represents a search history for at least one registered user, according to various embodiments. In one embodiment, content processing platform 109 tracks and records the search history of the registered user. In one example embodiment, when the registered user is performing a search in the search tab 613, he/she is presented with a drop-down menu 615 that chronologically lists the recently conducted searches. The registered user can select the searched item from the drop-down menu 615.

Figure 7B:
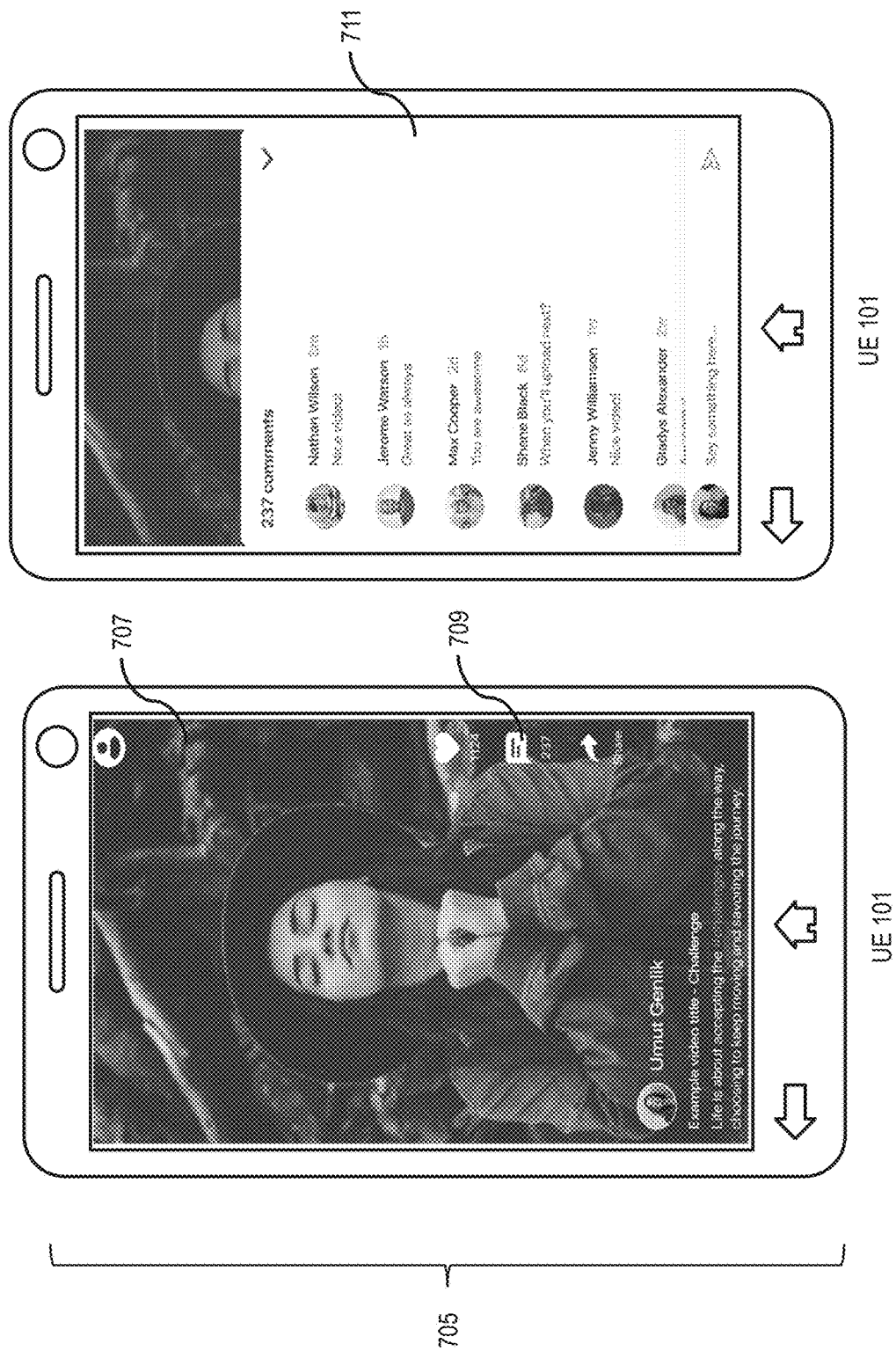
Figure 7C:
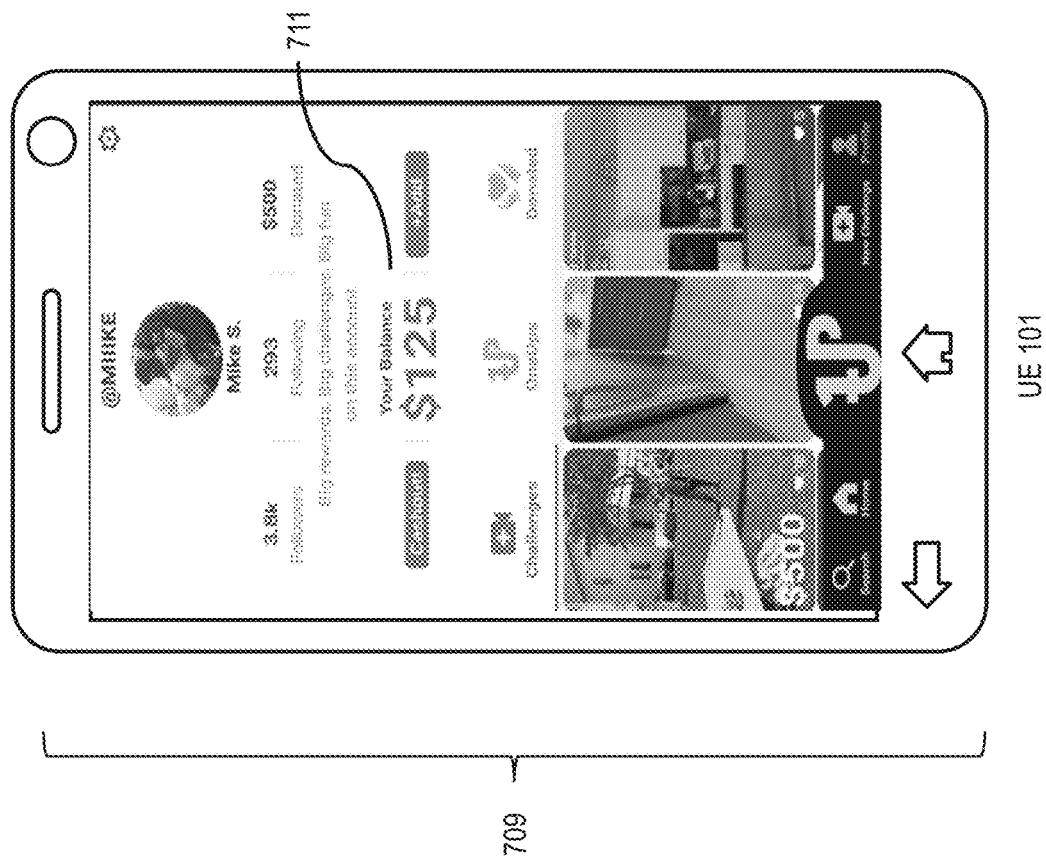
FIGS. 7C-7E are user interface diagrams that represent an interface for establishing a monetary reward account for users, according to various embodiments.
Figure 7D:
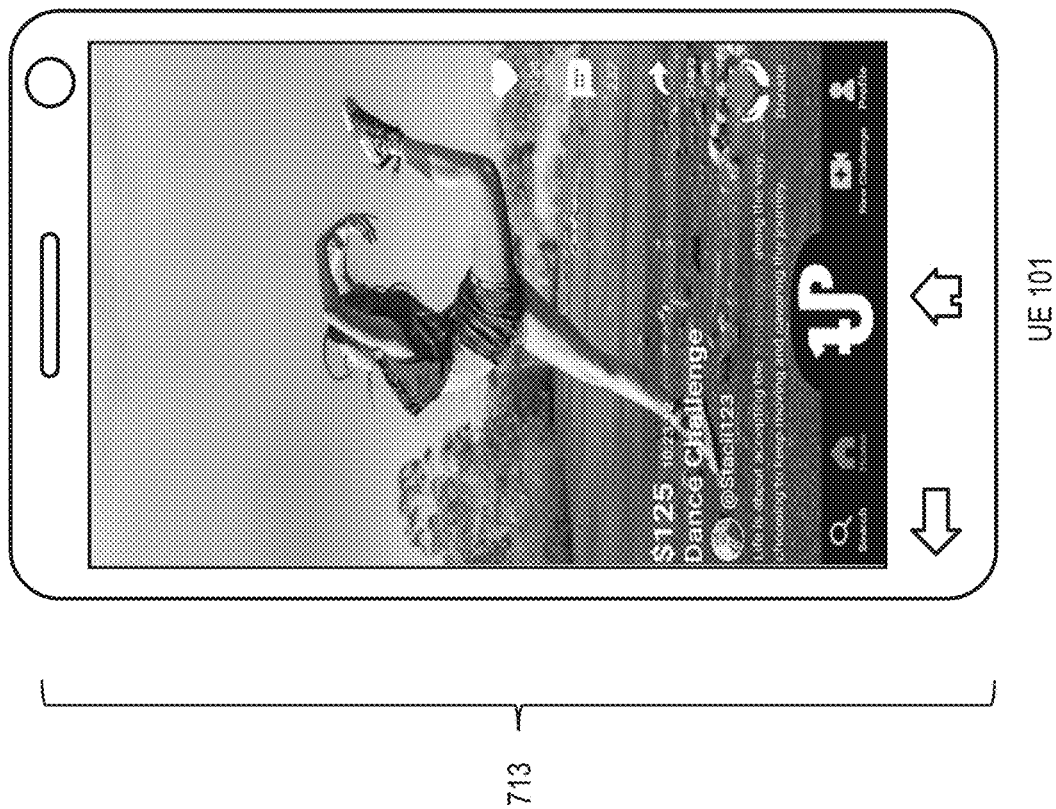
Figure 7E:
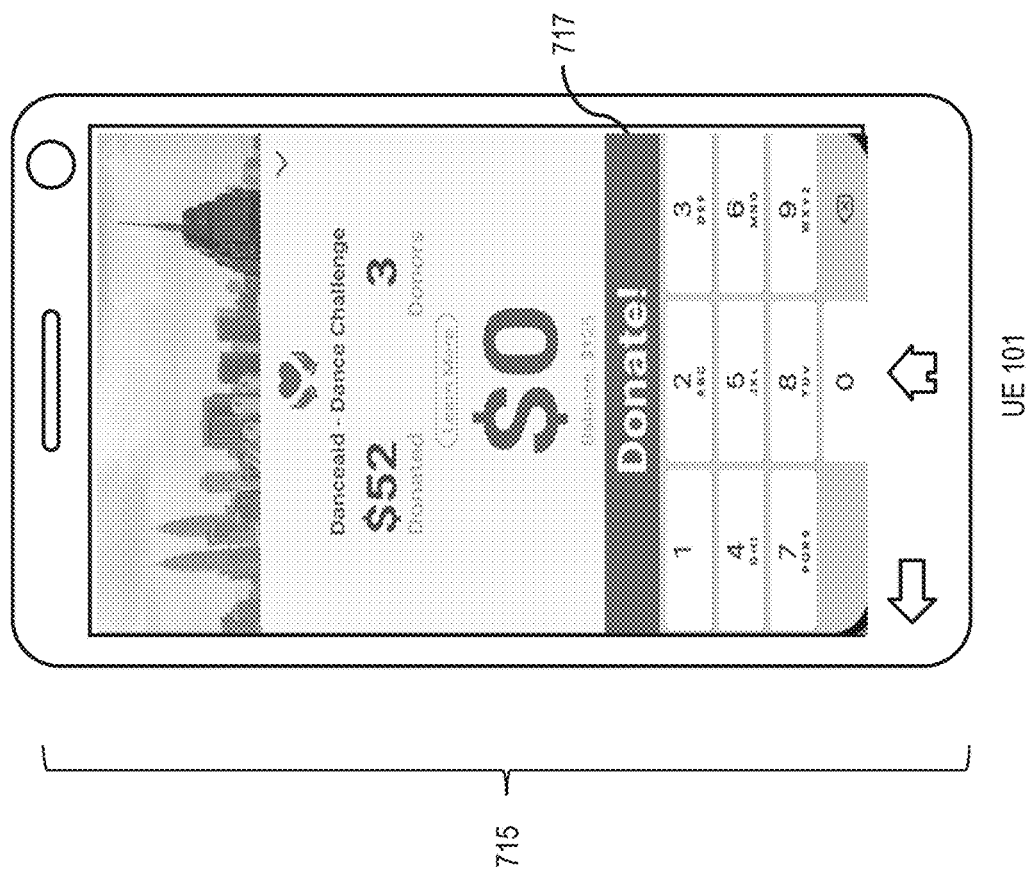

FIGS. 7A-7B are user interface diagrams that represent a configuration interface for newly created content, according to various embodiments. As illustrated in FIG. 7A, a registered user can configure the setting for content, e.g., a challenge video, before or after uploading it to a social media platform. The registered user may click the next tab 701 superimposed on their content, thereafter the user is navigated to configuration page 703. During the configuration process, the user may: (i) add a title, (ii) add a description, (iii) choose a category, (iv) enable or disable comments, and (v) enable or disable other registered users to create similar content to get more likes, comments, shares, views, etc. Adverting to FIG. 7B, interface 705 for an uploaded competing content 707 also displays the number of likes, comments, and shares received for content 707. In one embodiment, the number of likes, comments, and shares are superimposed on the righthand side corner of the uploaded competing content 707. Furthermore, interface 705 provides notification to the users regarding their content, e.g., title recommendation for the competing content 707. In one embodiment, a user may click on the comments tab 709 to view the comments received for the competing content 707, whereupon the user is navigated to interface 711.

FIGS. 7C-7E are user interface diagrams that represent an interface for establishing a monetary reward account for users, according to various embodiments. As described in FIG. 7C, the platform 109 supports a reward mechanism whereby a user can a reward balance, which may be in form of money or credit points. In this manner, each registered user can be assigned an account or balance; the balance can be linked to a bank account and/or other financial transaction systems, e.g., Venmo®, PayPal®, Zelle®, etc. By way of example, new challenges that are created can be attributed a certain reward (e.g., "prize" money) for a particular duration; the user that responds to the particular challenge and garners the highest score will win the reward. The amount of the reward can then be added to the winning user's balance. As explained below, the user may donate any or all portion of the prize money to a charitable cause.

The scenarios depicted in FIGS. 7C-7E involving monetary reward expressed in terms of a particular currency, e.g., US dollars; it is noted that other currencies (e.g., foreign currencies, or crypto currencies) can be utilized. Per FIG. 7C, interface 709 provides for a user to maintain a balance, as seen in section 711, for the various content that the user has created and been rewarded for. In this example, the user has earned $125 for producing content. In the example of FIG. 7D, interface 713 indicates that $125 is the prize amount for a "Dance Challenge." The platform 109 can specify any reward amount based on, e.g., popularity of the activity, number of users, sponsorship, or any combination thereof. As noted, the platform 109 provides the capability for users to contribute to charitable organizations. As shown in FIG. 7E, interface 715 permits a registered user to donate, via button 717, to readily execute a donation. The receiving charity can be made as part of the user's profile or can be dynamically prompted (not shown).

The processes described herein for facilitating a virtual competition for content creation and an effective UI for presenting content in an organized manner may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
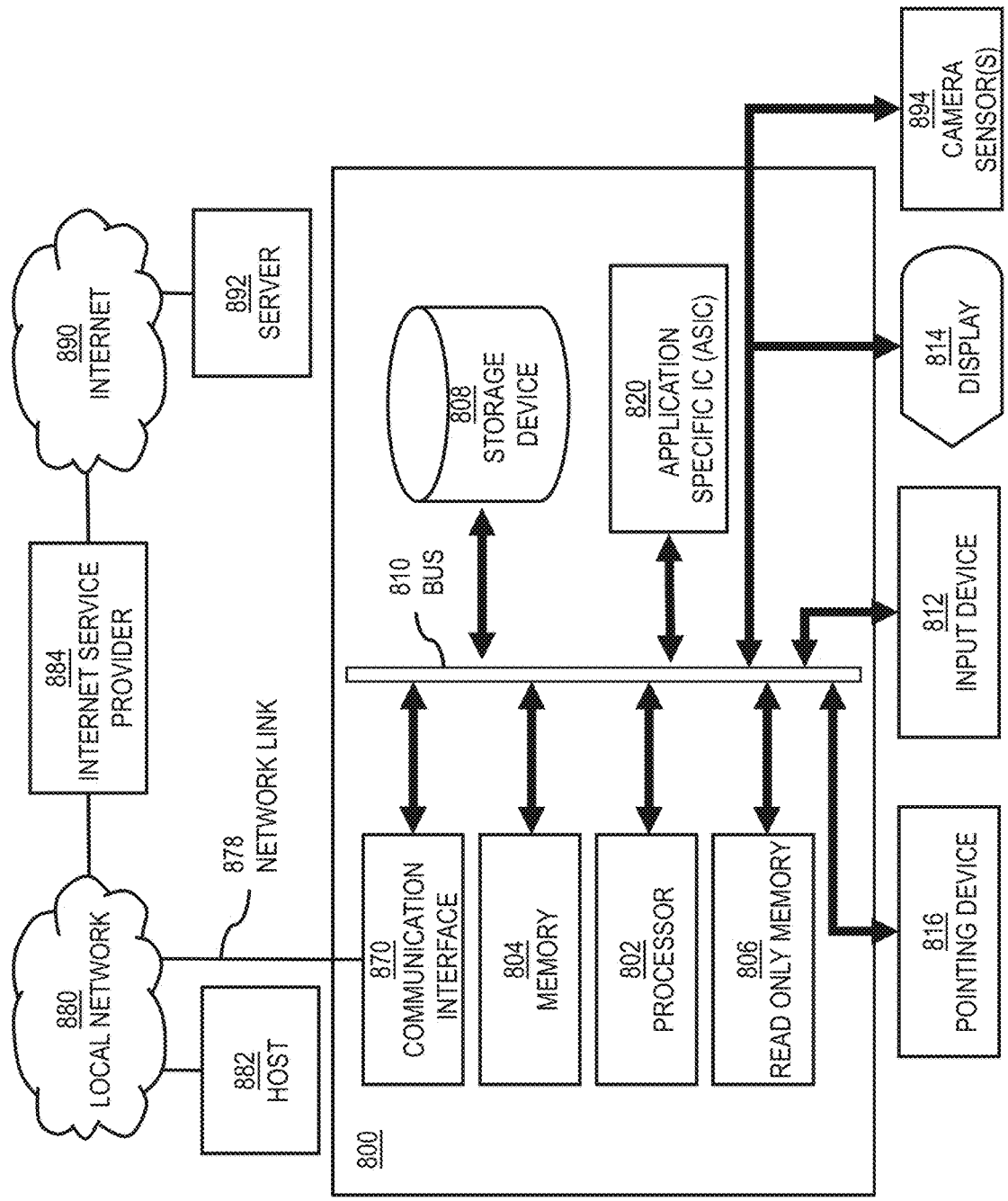
FIG. 8 is a diagram of hardware that can be used to implement an embodiment.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to facilitate a virtual competition for content creation and an effective UI for presenting content in an organized manner as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to facilitate a virtual competition for content creation and an effective UI for presenting content in an organized manner. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for facilitating a virtual competition for content creation and an effective UI for presenting content in an organized manner. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for facilitating a virtual competition for content creation and an effective UI for presenting content in an organized manner, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners, and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for facilitating a virtual competition for content creation and an effective UI for presenting content in an organized manner to the UE 101.

The term "computer-readable medium" is used herein to refer to any medium that participates in providing information to processor 802, including instructions for execution. Such a medium may take many forms, including, but not limited to, computer-readable storage medium (e.g., non-volatile media, volatile media), and transmission media. Non-volatile media include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
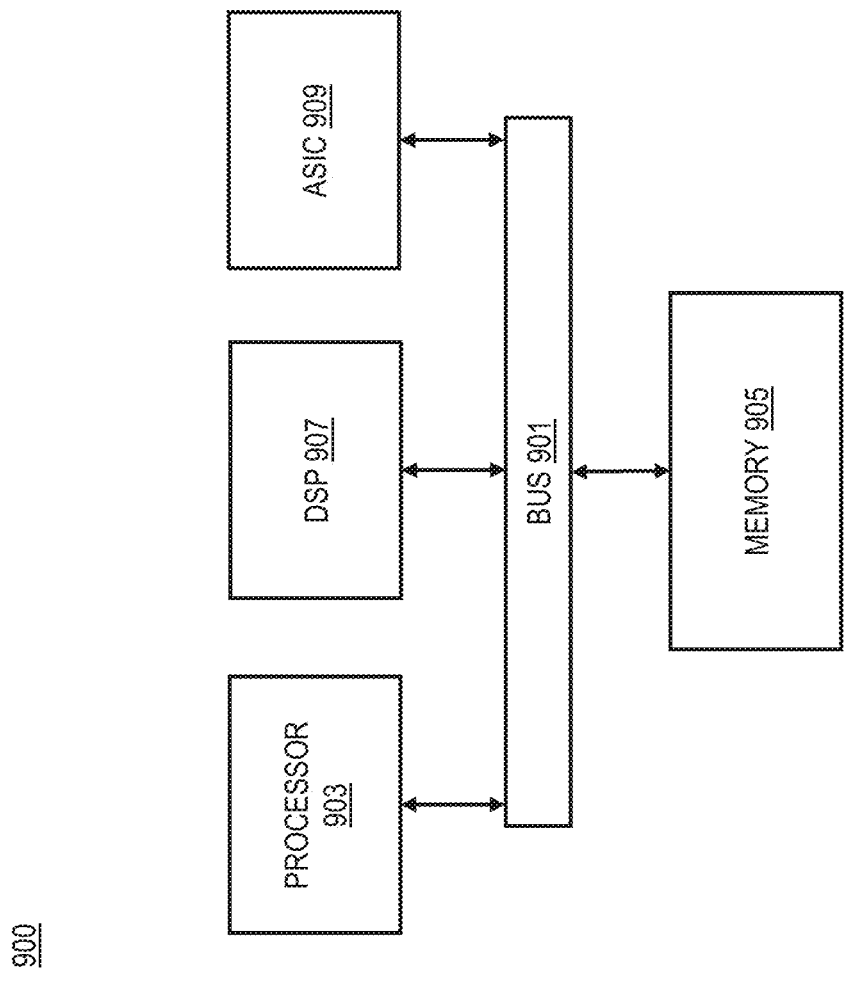
FIG. 9 is a diagram of a chipset that can be used to implement an embodiment.

FIG. 9 illustrates a chip set 900 upon which an embodiment of the invention may be implemented. Chip set 900 is programmed to facilitate a virtual competition for content creation and an effective UI for presenting content in an organized manner as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to facilitate a virtual competition for content creation and an effective UI for presenting content in an organized manner. The memory 905 also stores the data associated with or generated by the execution of the inventive steps.

Figure 10:
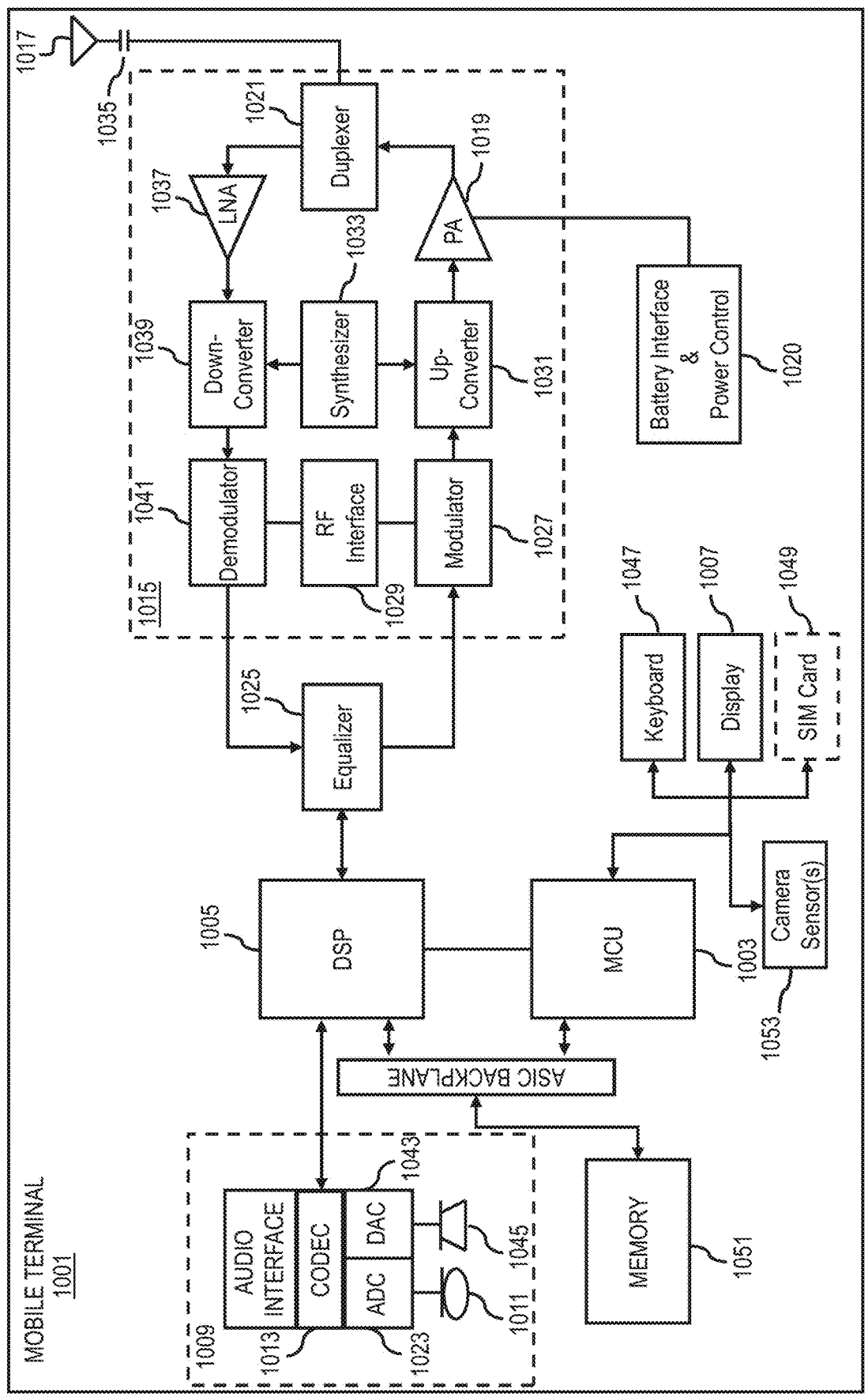
FIG. 10 is a diagram of a mobile station (e.g., handset) that can be used to implement an embodiment.

FIG. 10 is a diagram of exemplary components of a mobile terminal (e.g., handset) capable of operating in the system of FIG. 1A, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to facilitate a virtual competition for content creation and an effective UI for presenting content in an organized manner. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

Further, one or more camera sensors 1053 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a first content that is captured at a user device and captures execution of a first activity by a first user, wherein the first content is to be presented in a first arrangement;
   receiving a second content that is captured at another user device and captures execution of a second activity by a second user;
   determining, by one or more processors, a degree of similarity of the first activity and the second activity based on one or more image grid point matching algorithms, one or more machine learning algorithms, or a combination thereof;
   determining, by the one or more processors, that the first activity and the second activity are a common physical activity based on the degree of similarity;
   generating a score of the first activity and a score of the second activity based on feedback from a plurality of users, wherein the first user, the second user, and the plurality of users are associated with a content processing platform;
   ranking the first content and the second content based on the scores;
   organizing the first content and the second content for presentation in a second arrangement based on the ranking;
   initiating presentation of the second arrangement to a plurality of user devices associated with the plurality of users;
   establishing a plurality of user profiles for the plurality of users to include a corresponding plurality of reward accounts;
   initiating a challenge on the content processing platform, wherein the first content and the second content are received in response to the challenge;
   assigning at least one reward credit to a category of activities including the common activity associated with the challenge;
   determining that the first content is ranked higher than the second content with respect to the challenge; and
   allocating the at least one reward credit to the reward account associated with the user profile of the first content.

2. The method of claim 1, wherein the first arrangement specifies displaying the first content and the second content in a vertical orientation within a plurality of user interfaces of the plurality of user devices.

3. The method of claim 2, wherein the first content and the second content are displayed within the vertical orientation according to a sequence that is based on the ranking.

4. The method of claim 1, further comprising:
   determining that the user profile associated with the user device associated with the first content include transactional information of a charitable organization;
   initiating presentation of a donation icon associated with the charitable organization together with the at least one reward credit, and a reward balance of the reward account at the user device associated with the first content;
   receiving a donate message generated in response to user interaction with the donation icon from the user device associated with the first content; and
   initiating, in response to the donate massage, transfer of the at least one reward credit out of the reward account associated with the user profile of the first content according to the transaction information,
   wherein the content processing platform is a social media platform.

5. The method of claim 1, further comprising:
   retrieving one of a plurality of ranking criteria associated with the determined common activity; and
   applying the one ranking criteria to the first activity and the second activity determine the score.

6. A system comprising:
   a memory configured to store computer-executable instructions; and
   one or more processors configured to execute the instructions to:

receive a first content that is captured at a user device and captures execution of a first activity by a first user, wherein the first content is to be presented in a first arrangement;

receive a second content that is captured at another user device and captures execution of a second activity by a second user;

determine a degree of similarity of the first activity and the second activity based on one or more image grid point matching algorithms, one or more machine learning algorithms, or a combination thereof;

determine that the first activity and the second activity are a common physical activity based on the degree of similarity;

generate a score of the first activity and a score of the second activity based on feedback from a plurality of users, wherein the first user, the second user, and the plurality of users are associated with a content processing platform;

rank the first content and the second content based on the scores;

organize the first content and the second content for presentation in a second arrangement based on the ranking;

initiate presentation of the second arrangement to a plurality of user devices associated with the plurality of users;

establish a plurality of user profiles for the plurality of users to include a corresponding plurality of reward accounts;

initiate a challenge on the content processing platform, wherein the first content and the second content are received in response to the challenge;

assign at least one reward credit to a category of activities including the common activity associated with the challenge;

determine that the first content is ranked higher than the second content with respect to the challenge; and allocate the at least one reward credit to the reward account associated with the user profile of the first content.

7. The system of claim 6, wherein the first arrangement specifies displaying the first content and the second content in a vertical orientation within a plurality of user interfaces of the corresponding plurality of user devices.

8. The system of claim 7, wherein the first content and the second content are displayed within the vertical orientation according to a sequence that is based on the ranking.

9. The system of claim 6, wherein the one or more processors are further configured to execute the instructions to:

determine that the user profile associated with the user device associated with the first content include transactional information of a charitable organization;

receive a donate message from the user device associated with the first content; and initiate, in response to the donate massage, transfer of the at least one reward credit out of the reward account associated with the user profile of the first content according to the transaction information.

10. The system of claim 6, wherein the one or more processors are further configured to execute the instructions to:

retrieve one of a plurality of ranking criteria associated with the determined common activity; and apply the one ranking criteria to the first activity and the second activity determine the score.

11. An apparatus comprising:
at least one processor; and
at least one memory including computer program code for one or more programs,
the at least one memory and the computer program code configured to, with the at least one processor, cause the apparatus embedded in a user device to perform at least the following, generate a first content capturing execution of a first activity by a first user;

initiate communication with a content processing platform to upload the first content;

receive a second content capturing execution of a second activity by a second user as generated by another user device from the content processing platform in response to the uploaded first content, wherein that the first activity and the second activity are a common physical activity;

determine a degree of similarity of the first activity and the second activity based on one or more image grid point matching algorithms, one or more machine learning algorithms, or a combination thereof;

generate a score of the first activity and a score of the second activity based on the degree of similarity;

rank the first content and the second content based on the scores; and display, via a user interface of the user device, the first content and the second content according to the ranking;

establish one of a plurality of user profiles for a plurality of users to include a corresponding plurality of reward accounts, wherein the plurality of users include the first user and the second user;

initiate a challenge on the content processing platform, wherein the first content and the second content are received in response to the challenge;

assign at least one reward credit to a category of activities including the common physical activity associated with the challenge;

determine that the first content is ranked higher than the second content with respect to the challenge; and allocate the at least one reward credit to the reward account associated with the user profile of the first content.

12. The apparatus of claim 11, wherein the first content and the second content are displayed according to a first orientation within the user interface, and other content associated with a different physical activity is displayed in a second orientation, and the apparatus is further caused to:

detect a swipe in a direction of the first orientation for the first activity, wherein the first orientation is vertical, and the second orientation is horizontal; and display additional content of the first activity with respect to the ranking.

13. The apparatus of claim 12, wherein the apparatus is further caused to:

detect another swipe in another direction of the second orientation; and display the other content of the different physical activity.

14. The apparatus of claim 11, wherein the apparatus is further caused to:

present, via the user interface, a donation section prompting for transfer of the at least one reward credit.

15. The apparatus of claim 12, wherein the apparatus is further caused to:

retrieve the other content of the different physical activity;
specify feedback information for the other content; and initiate transmission of the feedback information to the content processing platform for scoring and ranking of the other content.

16. The apparatus of claim 11, wherein the first content relates to a competition within the first activity.

\* \* \* \* \*